(12) United States Patent
Ikeya

(10) Patent No.: US 6,820,515 B2
(45) Date of Patent: Nov. 23, 2004

(54) GEAR SHIFT LEVER OPERATING MECHANISM

(76) Inventor: Shinji Ikeya, c/o Ikeya Formula Co., Ltd., 537-4 Nojiri, Kanuma-shi, Tochigi (JP)

( * ) Notice: Subject to any disclaimer, the term of this patent is extended or adjusted under 35 U.S.C. 154(b) by 0 days.

(21) Appl. No.: 10/181,635

(22) PCT Filed: Feb. 8, 2001

(86) PCT No.: PCT/JP01/00896

§ 371 (c)(1),
(2), (4) Date: Aug. 7, 2002

(87) PCT Pub. No.: WO01/59335

PCT Pub. Date: Aug. 16, 2001

(65) Prior Publication Data

US 2003/0047020 A1 Mar. 13, 2003

(30) Foreign Application Priority Data

Feb. 9, 2000 (JP) .......................................... 2000-031725
Jan. 12, 2001 (JP) .......................................... 2001-005520

(51) Int. Cl.[7] .............................................. B60K 20/00
(52) U.S. Cl. ................... 74/473.3; 74/473.1; 74/473.34
(58) Field of Search ............................ 74/473.34, 473.3, 74/473.33, 337.5, 473.1

(56) References Cited

U.S. PATENT DOCUMENTS

| | | | | |
|---|---|---|---|---|
| 1,933,908 A | * | 11/1933 | Hoppenstand | 74/337.5 |
| 2,577,019 A | * | 12/1951 | Henry | 74/337.5 |
| 2,929,260 A | * | 3/1960 | Hodkin | 74/337.5 |
| 3,625,032 A | * | 12/1971 | Muhleck | 70/202 |
| 3,636,793 A | * | 1/1972 | Bieber | 74/473.1 |
| 3,954,021 A | * | 5/1976 | Mraz | 74/337.5 |
| 4,028,959 A | * | 6/1977 | Long | 74/473.23 |
| 5,542,309 A | * | 8/1996 | Wenger et al. | 74/337.5 |
| 5,740,695 A | * | 4/1998 | Janson | 74/337.5 |
| 6,122,983 A | * | 9/2000 | Hoffman | 74/337.5 |
| 6,487,927 B1 | * | 12/2002 | Sputhe | 74/337.5 |

FOREIGN PATENT DOCUMENTS

| | | |
|---|---|---|
| JP | 47-42644 | 10/1972 |
| JP | 46865/1974 | 11/1975 |
| JP | 91581/1993 | 12/1994 |
| JP | 08-3030703 | 11/1996 |

* cited by examiner

*Primary Examiner*—Charles A. Marmor
*Assistant Examiner*—Eric M. Williams
(74) *Attorney, Agent, or Firm*—Jordan and Hamburg LLP

(57) ABSTRACT

A handling mechanism of a gearshift which enables the gearshift to shift into reverse, neutral, first-speed, second-speed, third-speed, and fourth-speed, and fifth-speed in sequential order includes a gearshift coupled to a shift fork of a transmission-handling mechanism of a manual transmission; a moving mechanism for the gearshift allowing it to move in an H-shaped configuration and an operation mechanism which enables a vehicle operator to shift the gears. The gearshift handling mechanism also includes an operation lever moves in a single plane, an auto-return mechanism which causes the operation lever to return to its initial position, and a rotation mechanism for engaging the gears.

17 Claims, 54 Drawing Sheets

GEAR SHIFT LEVER OPERATING MECHANISM

FIELD OF THE INVENTION

The present invention relates to a handling mechanism of a gearshift which is attached in a shift fork of a manual transmission.

BACKGROUND OF THE INVENTION

The conventional handling mechanism of a manual transmission attaches to a conventional gearshift in a shift fork, and is operated substantially by movement in an H-shaped configuration to change gears.

There is a problem that the operation of a manual transmission vehicle is poor because shifting of the gear is not operated well until the operator gets used to shifting a conventional gearshift in the H-shaped configuration. Also, there is a problem that the H-shape configuration lends itself to shifting to the wrong gear by mistake.

SUMMARY OF THE INVENTION

Accordingly, in the present invention the gears can be changed smoothly to a shift up, a shift down, neutral, or reverse with only minimal effort via an operation lever which is moved in the forward-backward direction. Moreover, the transmission can be changed with reliability into the proper gear since the shifting can only occur sequentially. Finally, the operator can quickly become familiar with the gearshift-handling mechanism.

The novel features which are believed to be characteristic of the invention, both as to its organization and method of operation, together with further objects and advantages thereof, are described below with reference to the accompanying drawings in which a presently preferred embodiment of the invention is illustrated as an example.

It is to be expressly understood, however, that the drawings are for the purpose of illustration and description only, and are not intended as a definition of the limits of the invention.

The gearshift-handling mechanism in accordance with the invention comprises a gearshift provided at a shift fork of a manual transmission, projecting slightly from a box of a transmission-handling mechanism; a moving mechanism for the gearshift allowing it to move in a substantially H-shaped configuration, a mechanism for moving a right-left moving cam and a forward-backward moving link; and an operation lever capable of movement in the forward-backward direction, allowing an operator to cause the gearshift to shift into reverse, neutral, first-speed, second-speed, third-speed and fourth-speed via the link and moving cam mechanism. The operation lever is also interchangeably referred to as a shift lever. Therefore, the user can shift the gear up and down by operating the operation lever in a single plane, so that anybody can operate it easily and erroneous shifting can be prevented.

In addition, the gearshift is allowed to move in a substantially H-shaped configuration by using four cams, so that the user can reliably shift gears via the operation lever which moves in a single plane. Furthermore, the gearshift-handling mechanism has a simple structure and it is manufactured at low cost.

Moreover, since the gearshift is shifted up and down mechanically, the user who loves mechanical products will enjoy using it.

In addition, the gearshift-handling mechanism of a gearshift in accordance with the invention comprises a gearshift provided at a shift fork of a transmission-handling mechanism of a manual transmission, projecting slightly from a box of the transmission-handling mechanism, the gearshift being provided with an elongated hole at the projected portion thereof and a stopper at an upper portion thereof; a moving mechanism for the gearshift further including a right-left moving cam having a pair of support boards fixed to a case body of the transmission-handling mechanism of the manual transmission so as to cover both sides of the gearshift; a forward and backward moving link formed in the shape of a crank, attached to a portion adjacent a rear end of the support boards and inserted into the elongated hole of the gearshift, allowing the gearshift to move forward and backward; and a cam part attached to a portion adjacent a top end of the support boards, allowing the gearshift to move to right and left directions; and a mechanism for the right-left moving cam engaging with the cam and moving to right and left directions, and engaging with an engaging piece of the gearshift; and an operation lever supported pivotably at one of the support boards so as to move forward and backward. The gearshift-handling mechanism also includes an auto-return mechanism for returning the operation lever automatically to its initial position after the operation lever is moved either forward or backward its initial position and a rotation mechanism allowing the gearshift-handling mechanism to engage the gearshift into various gears such as reverse, neutral, first-speed, second-speed, third-speed, fourth-speed, and fifth-speed one-by-one in sequential order and to accomplish the same in the opposite direction. Therefore, upon moving the operation lever forward or backward, the operation lever returns to its initial position via the auto-return mechanism and the gearshift is caused to be moved due to the operation mechanism's interaction with the rotation mechanism and their interaction with the gearshift moving mechanism, thereby causing the gearshift to engage into its position for the next sequential gear.

DETAILED DESCRIPTION OF THE PREFERRED EMBODIMENTS

Figure 1:
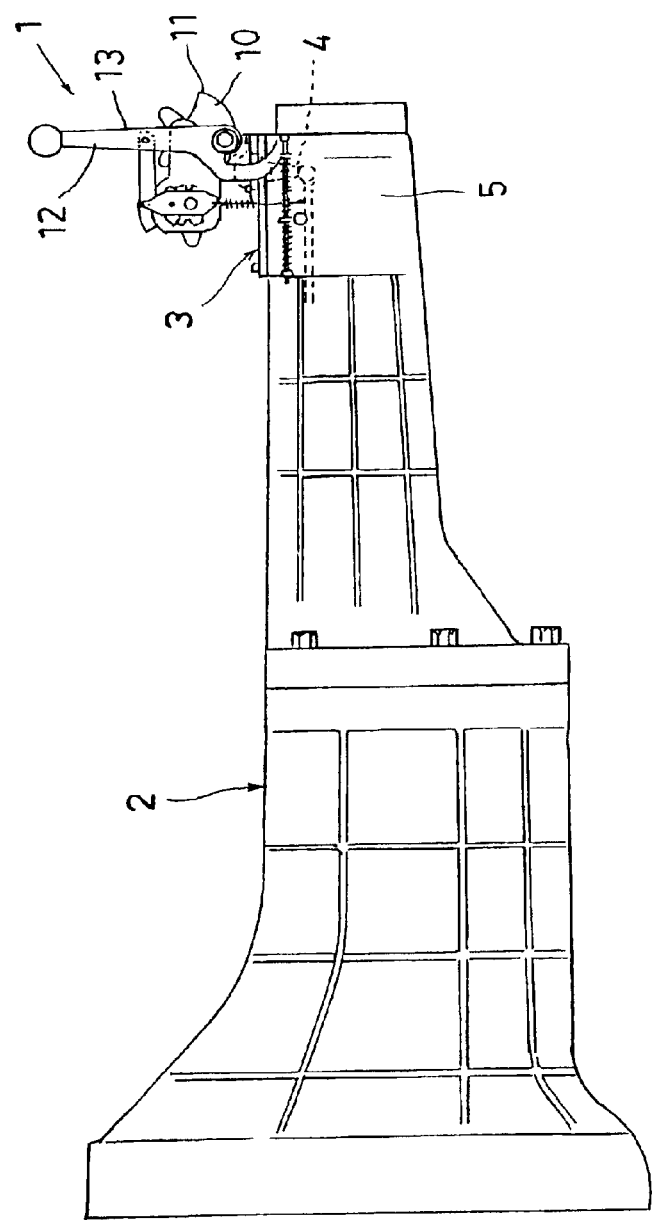
FIG. 1 is a side view showing the manner in which a gearshift-handling mechanism of the gearshift is attached in a first embodiment of the present invention.
Figure 2:
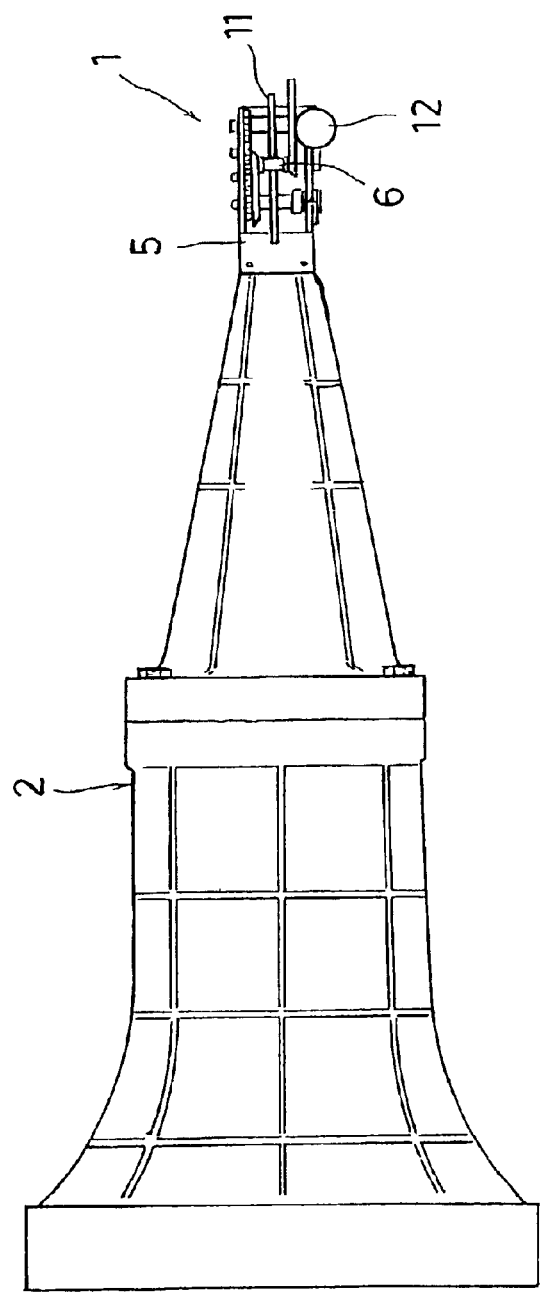
FIG. 2 is a plan view showing the manner in which a gearshift-handling mechanism of the gearshift is attached in a first embodiment of the present invention.
Figure 3:
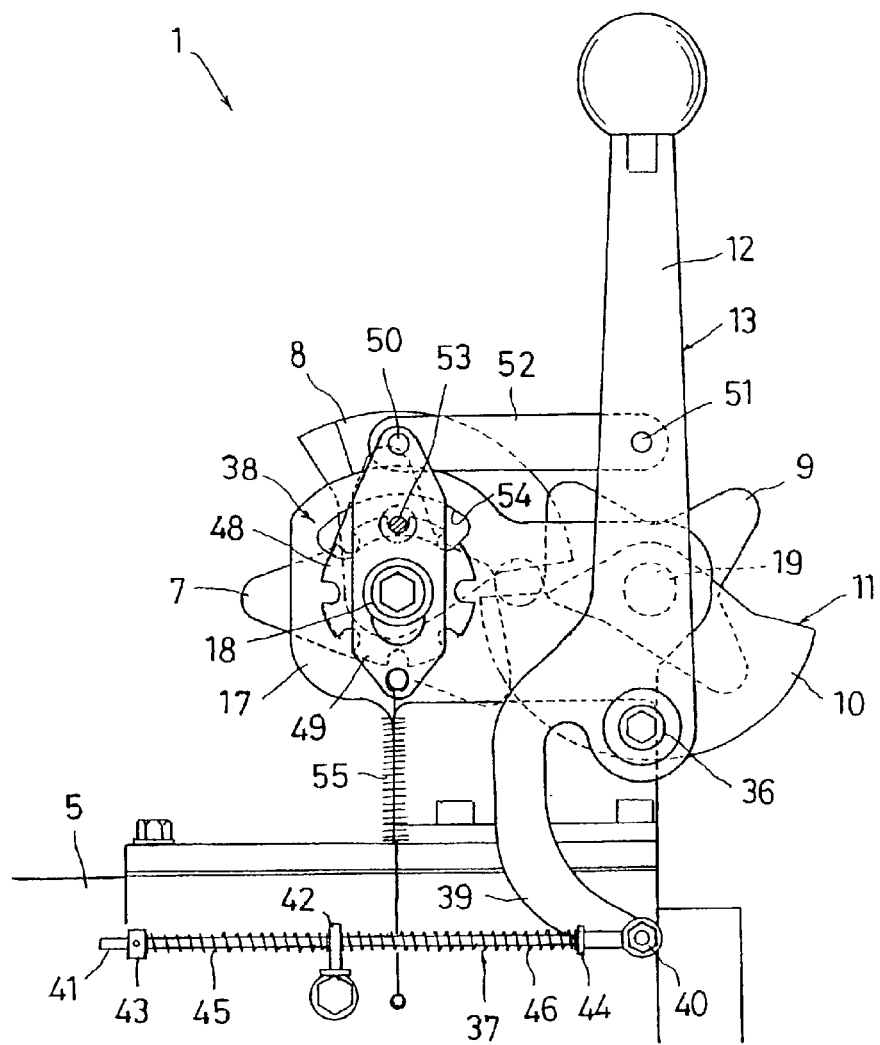
FIG. 3 is a side view of a first embodiment of the present invention.
Figure 4:
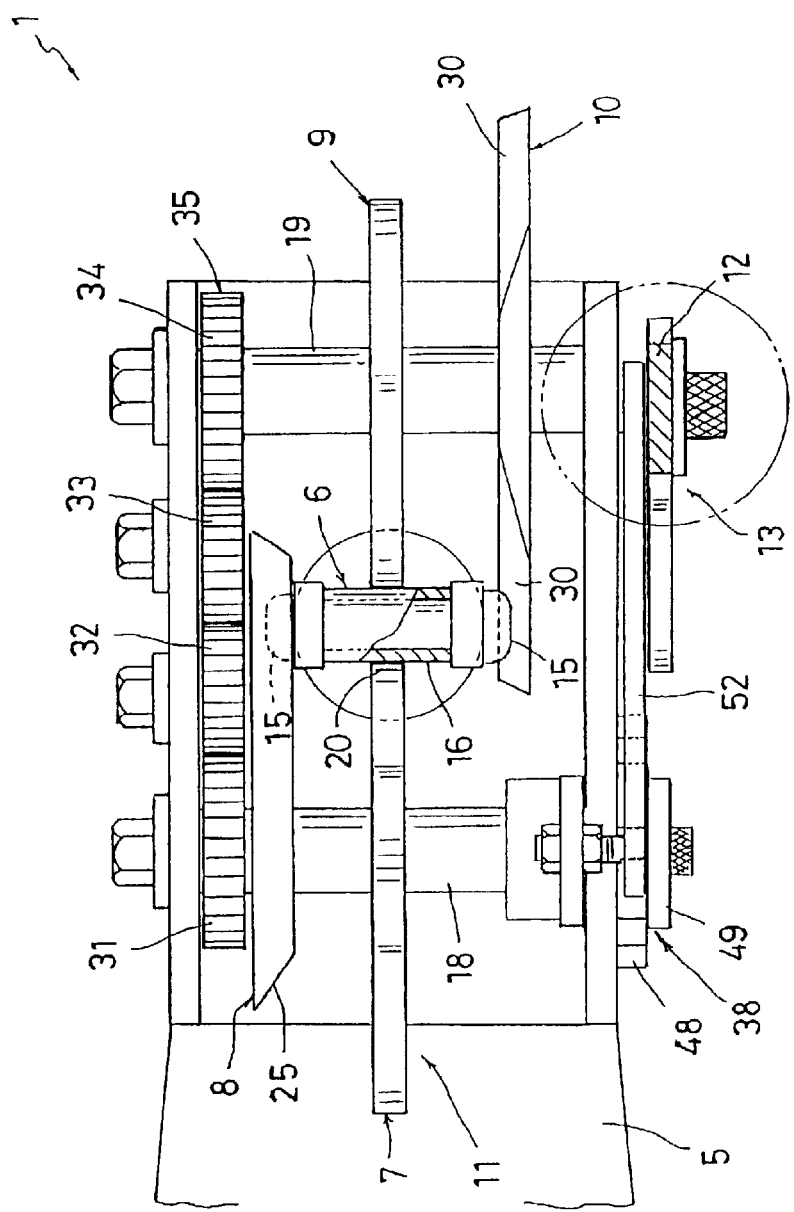
FIG. 4 is a plan view of a first embodiment of the present invention.
Figure 5:
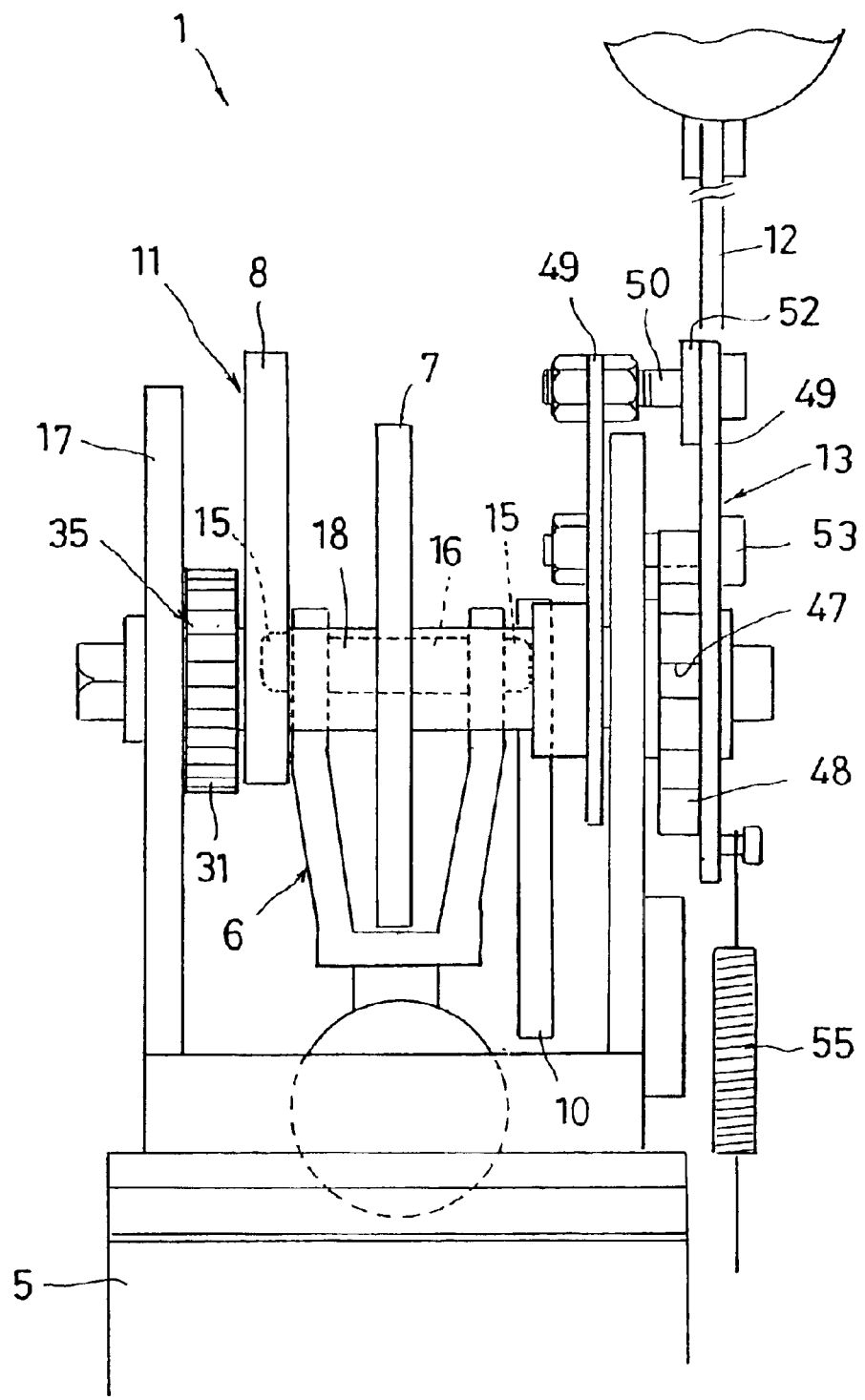
FIG. 5 is a front view of a first embodiment of the present invention.
Figure 6:
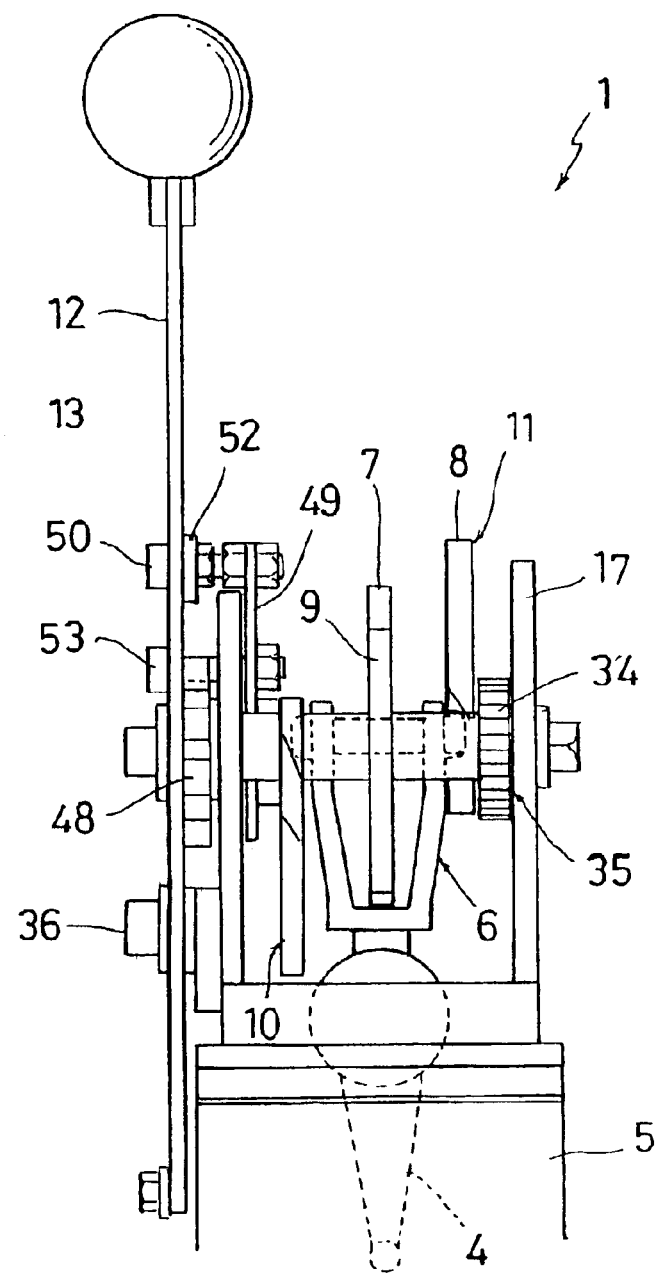
FIG. 6 is a reverse view of a first embodiment of the present invention.

Preferred embodiments of the present invention are described in more detail below with reference to the accompanying drawings.

FIGS. 1–28 illustrate a winding device of a first embodiment of the present invention. Reference numeral designates a gearshift-handling mechanism for a gearshift in accordance with the invention which is attached in a shift fork 4 of a transmission-handling mechanism 3 of the manual transmission 2. The gearshift-handling mechanism 1 comprises a gearshift 6, a gearshift movement mechanism 11 and an operation mechanism 13. A gearshift 6 is attached in the shift fork 4 and projects slightly beyond or more than the box 5 of the transmission-handling mechanism 3 of the above-mentioned transmission 2. The gearshift movement mechanism 11 includes four cams, namely, a first cam 7, second cam 8, third cam 9 and fourth cam 10, these cams allowing the gearshift 6 to move in a substantially H-shaped configuration. The operation mechanism 13 operates the gearshift movement mechanism 11 by operating the operation lever 12 to the forward and backward directions.

Figure 7:
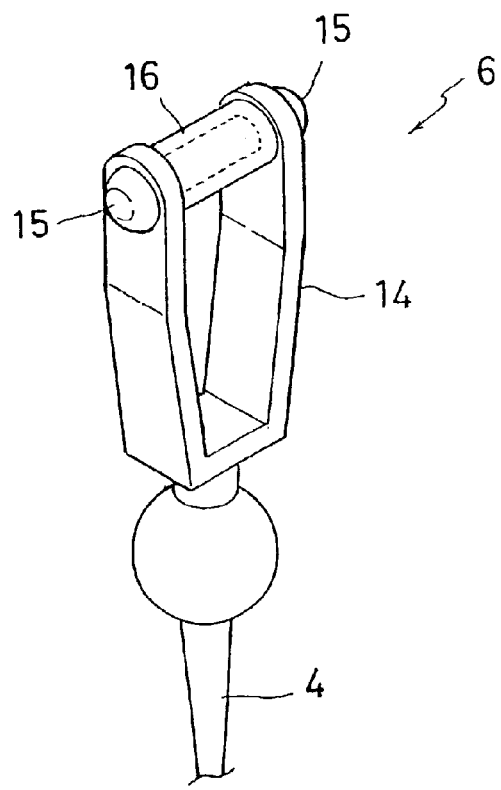
FIG. 7 is an explanation view of a gearshift in a first embodiment of the present invention.

As illustrated in FIG. 7, the gearshift 6 consists of a gearshift body 14 formed in the shape of the letter U, hemispherical guides 15 and a roller 16. The gearshift body 14 is attached so as to form one unit with the shift fork 4. The guide 15 is formed in a top portion of the side part of the gearshift body 14. The roller 16 is attached rotatably between the guides 15.

Figure 8:
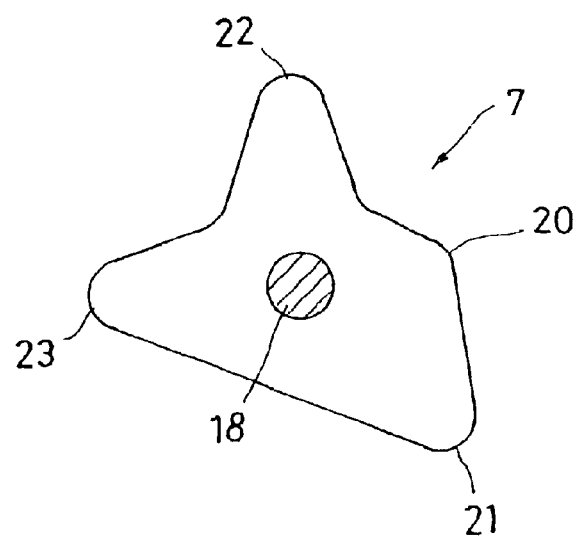
FIG. 8 is an explanation view of a first cam in a first embodiment of the present invention.
Figure 9:
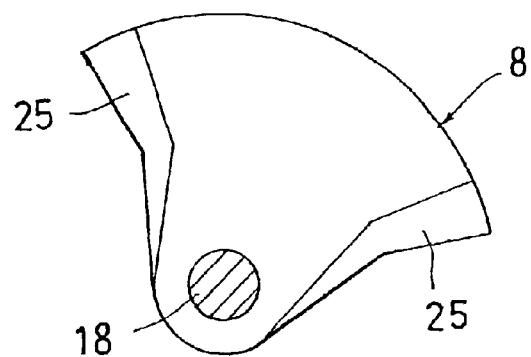
FIG. 9 is an explanation view of a second cam in a first embodiment of the present invention.
Figure 10:
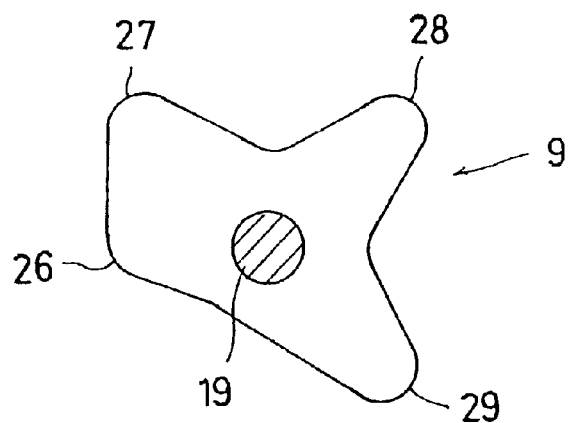
FIG. 10 is an explanation view of a third cam in a first embodiment of the present invention.
Figure 11:
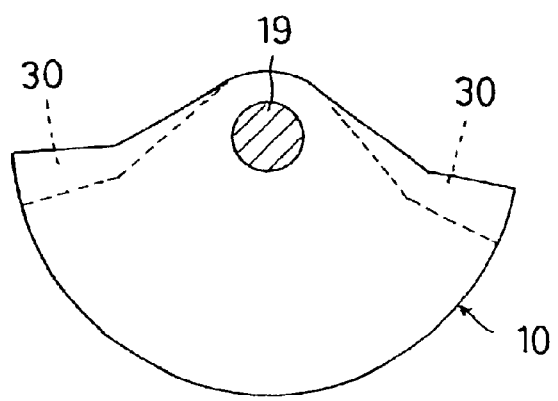
FIG. 11 is an explanation view of a fourth cam in a first embodiment of the present invention.

As illustrated in FIGS. 1–6, the above-mentioned gearshift movement mechanism 11 consists of a pair of support boards 17 first and second axles 18 and 19, the first cam 7, the second cam 8, the third cam 9, the fourth cam 10, and a transmission mechanism 35. The support boards 17 are fixed to the box 5 of the transmission-handling mechanism 3 so as to cover both sides of the gearshift 6. The axles 18, 19 are attached rotatably at forward and backward portions in the support boards 17 respectively. The first cam 7 is fixed to a substantial center portion of the first axle 18 and includes a thrust 20 to neutral, thrust 21 to reverse, thrust 22 to second-speed and thrust 23 to fourth-speed as illustrated in FIG. 8. Also, the first cam 7 thrusts the roller 16 of the gearshift 6 so that it moves to the center portion when the gearshift 6 shifts into neutral and it moves to the backward portion when the gearshift 6 shifts into second and fourth-speed. The second cam 8 is fixed to the part adjacent the right side of the first axle 18 and includes thrusts 25 for the guide 15 at both sides thereof. Also, the second cam 8 thrusts the guide 15 positioned at right side of the gearshift 6 so that it moves to the left side when the gearshift 6 shifts into first and second-speed. The third cam 9 is fixed to the central part of the second axle 19 and includes thrust 26 to neutral, thrust 27 to first-speed, thrust 28 to third-speed and thrust 29 to fifth-speed as illustrated in FIG. 10. Also, the third cam 9 thrusts the roller 16 of the gearshift 6 so that it moves to the forward portion when the gearshift shifts into first, third and fifth-speed. The fourth cam 10 is fixed to the part adjacent the left side of the second axle 19 and includes thrusts 30 for the guide at the sides thereof as illustrated in FIG. 11. Also, the fourth cam 10 thrusts the guide 15 positioned at the left side of the gearshift 6 so that it moves to the right side when the gearshift shifts into reverse, fourth-speed and fifth-speed.

The transmission mechanism 35 consists of a gear 31 fixed to a part adjacent the end portion of the right side of the first axle 18 and a gear 34 fixed to the second axle 19 engaging with the gear 31 through an even number of pinions, two pinions 32, 33 in the illustrated embodiment.

The operating mechanism 13, as illustrated in FIGS. 1–6, consists of an operation lever 12, an auto-return mechanism 37 for the operation lever and a rotation mechanism 38. The auto-return mechanism 37 is also interchangeably referred to as an auto-reverse mechanism. The operation lever 12 is supported pivotably at one of the support boards 17 of the moving mechanism 11 by a pivot pin 36, rotating forward and backward. The auto-return mechanism 37 puts the operation lever 12 back to its centered, initial position automatically when the operation lever 12 is released from forward and backward positions after rotating. The rotation mechanism 38 allows the operation lever 12 to rotate to a fixed angle, 45 degrees in the illustrated embodiment, by controlling the operation lever 12 forward or backward.

The auto-return mechanism 37 consists of a rod 41, a support body 42, and coiled springs 45, 46. The rod 41 is supported pivotably at a lower end of a rod support part 39 projecting downward from the pivot pin 36 of the operation lever 12 by a pivot pin 40. The support body 42 is fixed to the box 5 which supports the rod 41 slidably at a center part of the rod 41. The coiled springs 45, 46 are interposed between spring support parts 43, 44 provided at the rod 41 and the support body 42.

Figure 12:
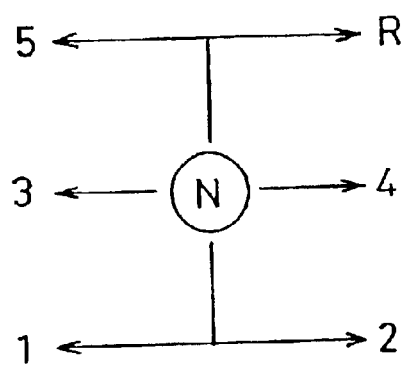
FIG. 12 is an explanation view of a shift pattern of a gear of a first embodiment of the present invention.
Figure 13:
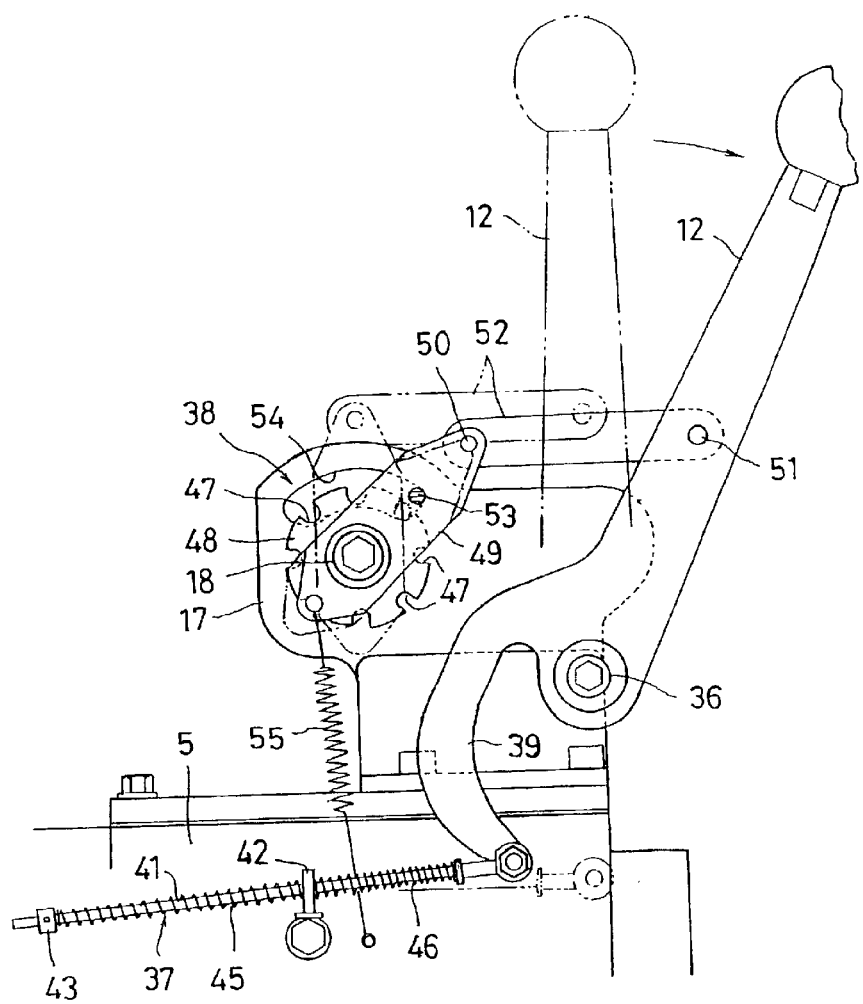
FIG. 13 is an explanation view showing the manner in which the operation lever rotates pivotably rearward.
Figure 14:
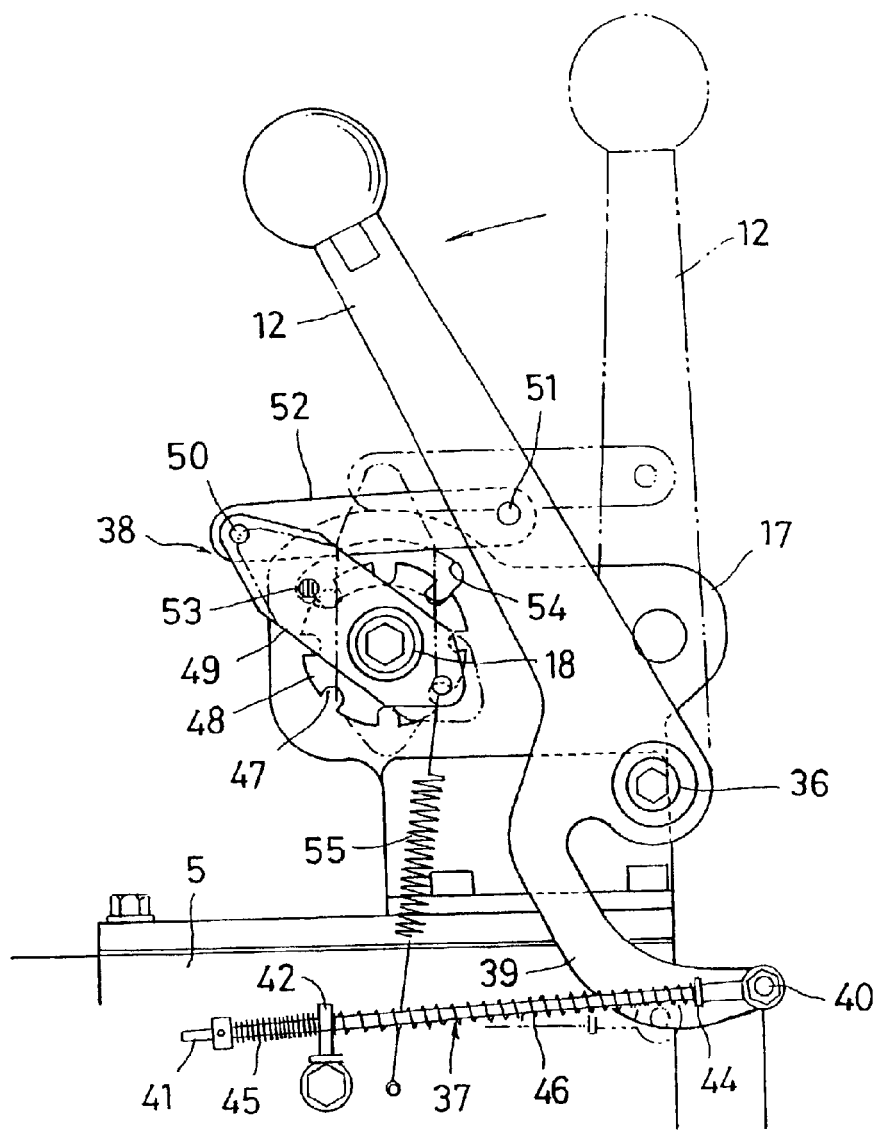
FIG. 14 is an explanation view showing the manner in which the operation lever rotates pivotably forward.

As illustrated in FIGS. 12–14, the rotation mechanism 38 consists of a rotation board 48, a pair of rotation arms 49, an operation arm 52, a through hole 54 and spring 55. The rotation board 48 includes a plurality of concave portions, eight concave portions in the illustrated embodiment, arranged at the outer circumferential portion thereof, and is fixed to the first axle 18, located at outside the left support board 17. The rotation arms 49 are attached and supported rotatably to the first axle 18 and are located at the outside of the rotation board 48 and the inside of the left support board 17, the rotation arms 49 being allowed to move upward and downward and having a free end portion thereof projecting upwardly.

One end portion of the operation arm 52 is rotatably attached to the free end portion of the rotation arms 49 by a pivot pin 50, and another end portion of the operation arm 52 is supported at a center portion of the operation lever 12 by a pivot pin 51. The through hole 54 is arranged at the right support board 17 located upward from the first axle 18 so as to engage an engagement pin 53 provided at the rotation arms 49 into the concave part 47 of the rotation board 48. The spring 55 allows the engagement pin 53 to engage into the concave part 47 by biasing the rotation arms 49 by a resilient force thereof.

Figure 15:
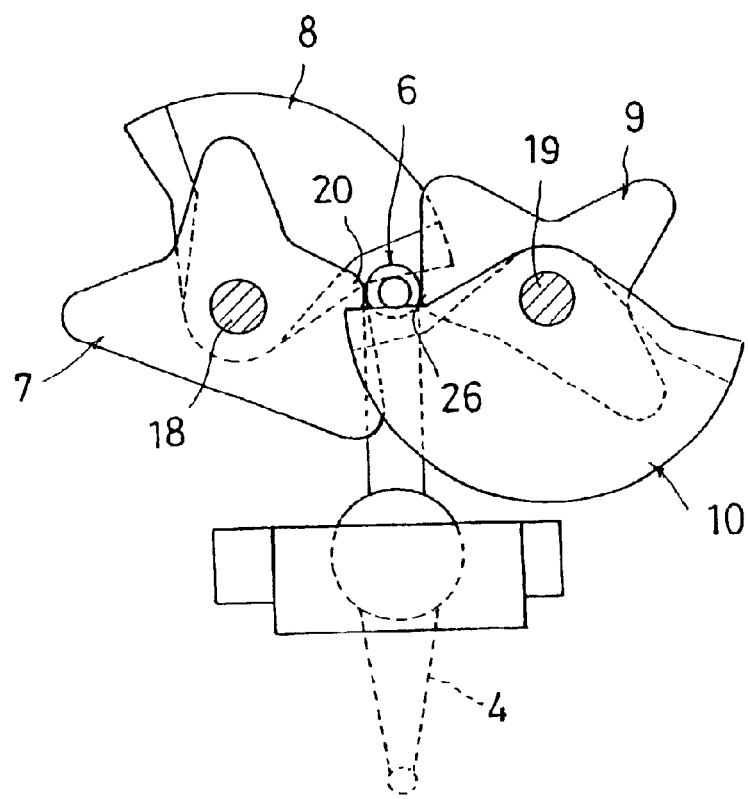
FIG. 15 is a side view showing a neutral state in a first embodiment of the present invention.
Figure 16:
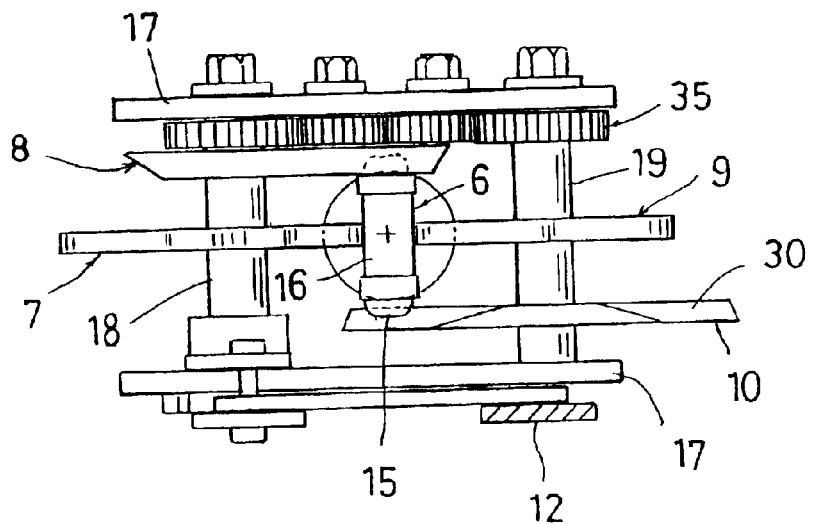
FIG. 16 is a plan view showing a neutral state in a first embodiment of the present invention.

When shifting into neutral, in the gearshift-handling mechanism 1 of the gearshift 6, as illustrated in FIGS. 15 and 16, the thrust part 20 of the first cam 7 and thrust part 26 of the third cam 9 push so as to locate the roller 16 of the gearshift 6 at its neutral position.

When shifting into reverse gear from neutral, the operation arm 52 of the rotation mechanism 38 is pressed forward by rotating the operation lever 12 by pressing forwardly, and the rotation arms 49 rotate and project upward.

Then, after the rotation board 48 rotates at 45 degrees, the engagement pin 53 engages the concave part 47. If an operator releases the operation lever 12 in this situation, the operation lever 12 returns automatically to its centered, initial position by a resilient force of the coiled springs 45, 46.

Figure 17:
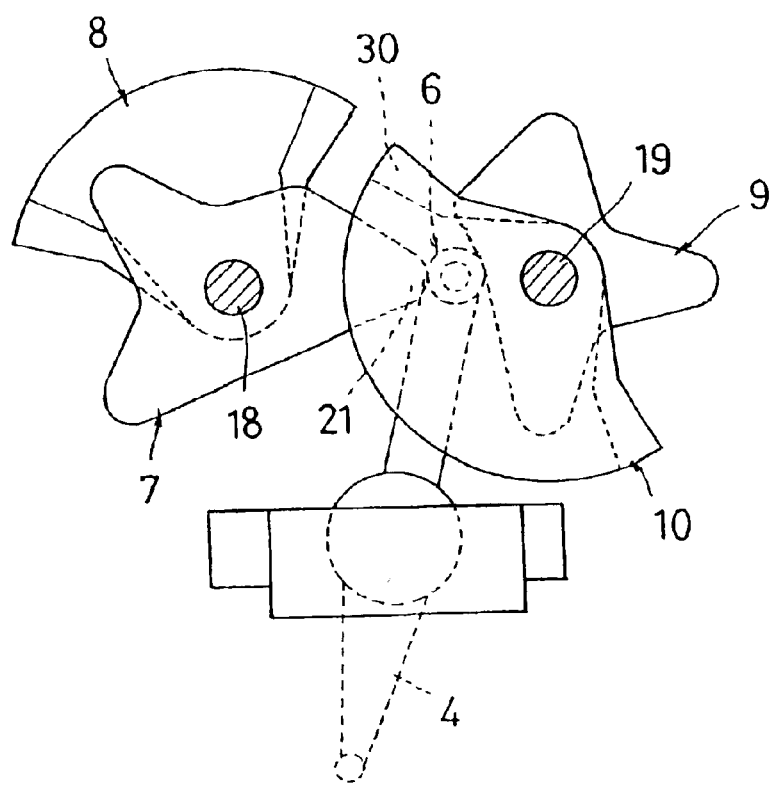
FIG. 17 is a side view showing a reverse state in a first embodiment of the present invention.
Figure 18:
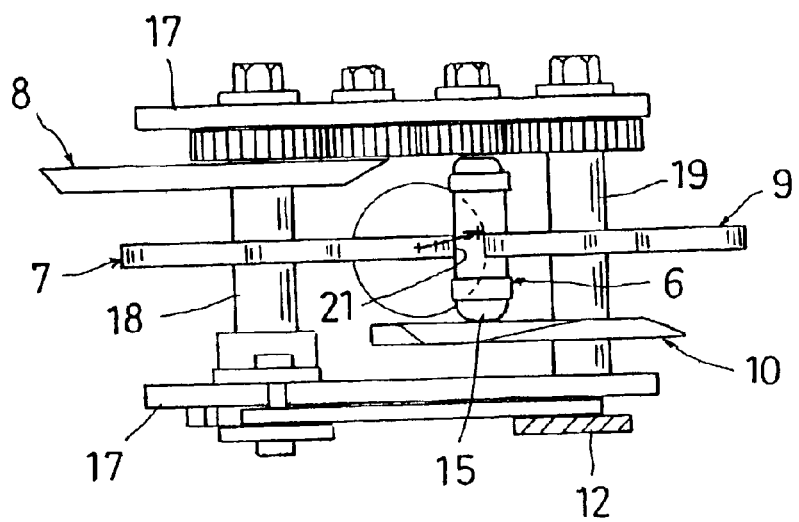
FIG. 18 is a plan view showing a reverse state in a first embodiment of the present invention.

As illustrated in FIGS. 17 and 18, as the rotation board 48 rotates at 45 degrees by operation of the rotation mechanism 38, the first axle 18 and second axle 19 rotate as well. Then, the guide 15 is pressed by the thrust part 30 of the fourth cam 10 so as to move it to the right, and the thrust part 21 of the first cam 7 allows the roller 16 to move backward and the series of movements shifts the gear.

When shifting into neutral from reverse gear, the first and second axles 18 and 19 rotate at 45 degrees due to the rotation mechanism 38 as a result of the operation lever 12 being moved backward and being caused to rotate, and reverse gear is shifted into neutral.

Figure 19:
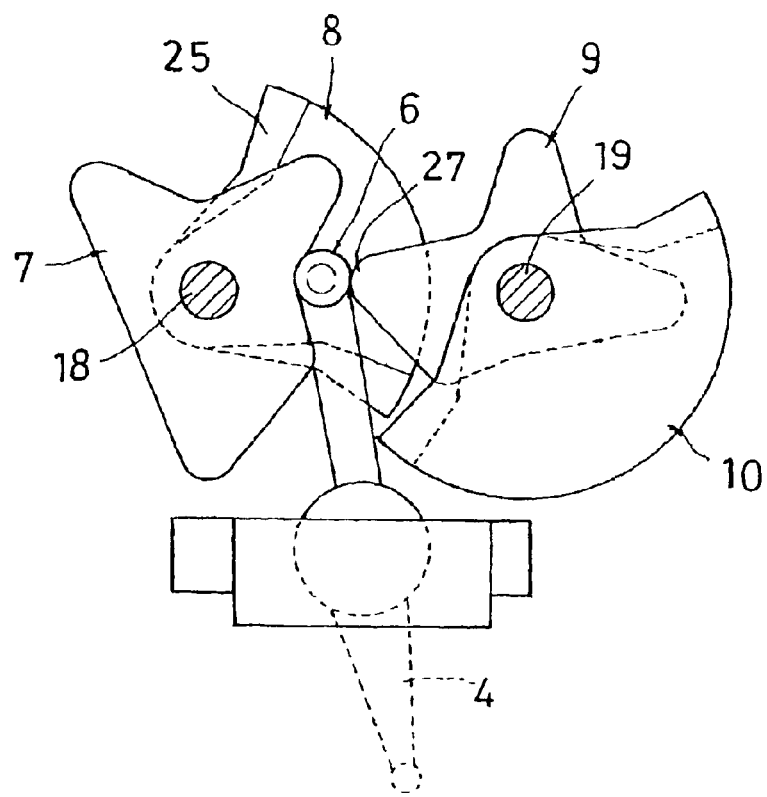
FIG. 19 is a side view showing a first-gear state in a first embodiment of the present invention.
Figure 20:
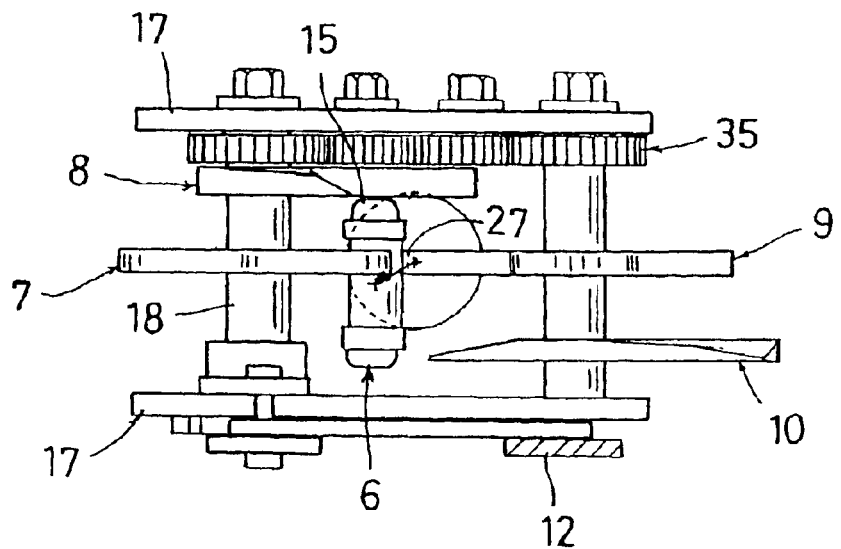
FIG. 20 is a plan view showing a first-gear state in a first embodiment of the present invention.

When shifting into first-speed from neutral stage, as illustrated in FIGS. 19 and 20, by pressing the operation lever 12 backward and causing it to rotate, the first and second axles 18, 19 rotate at 45 degrees due to the rotation mechanism 38, and the thrust part 25 of the second cam 8 presses the guide 15 so as to move it to the left. After that, the roller 16 of the gearshift 6 is allowed to move to the forward direction by the thrust 27 of the third cam 9 and the gear is shifted.

Figure 21:
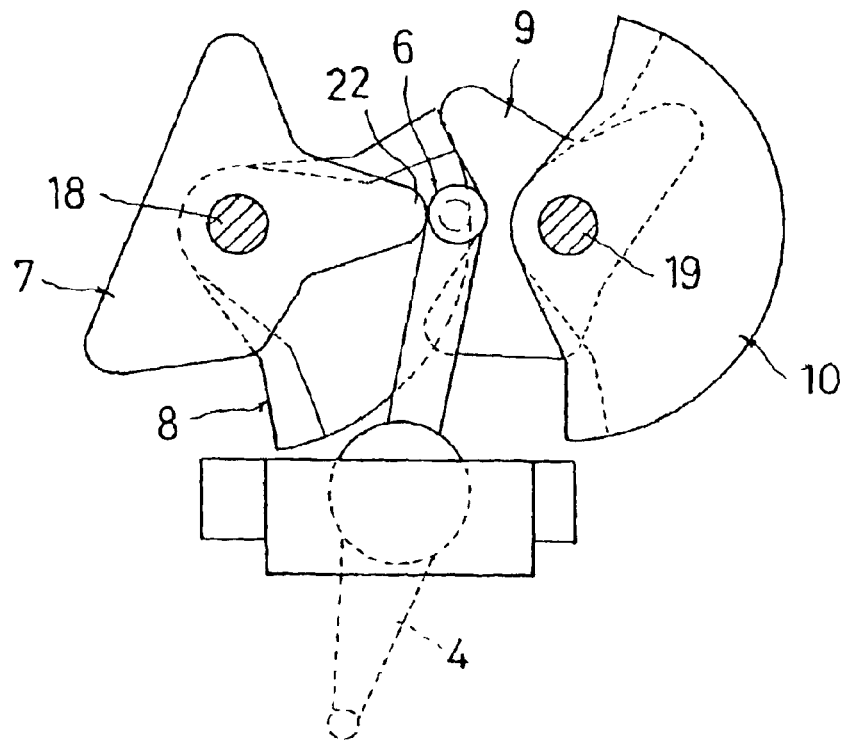
FIG. 21 is a side view showing a second-gear state in a first embodiment of the present invention.
Figure 22:
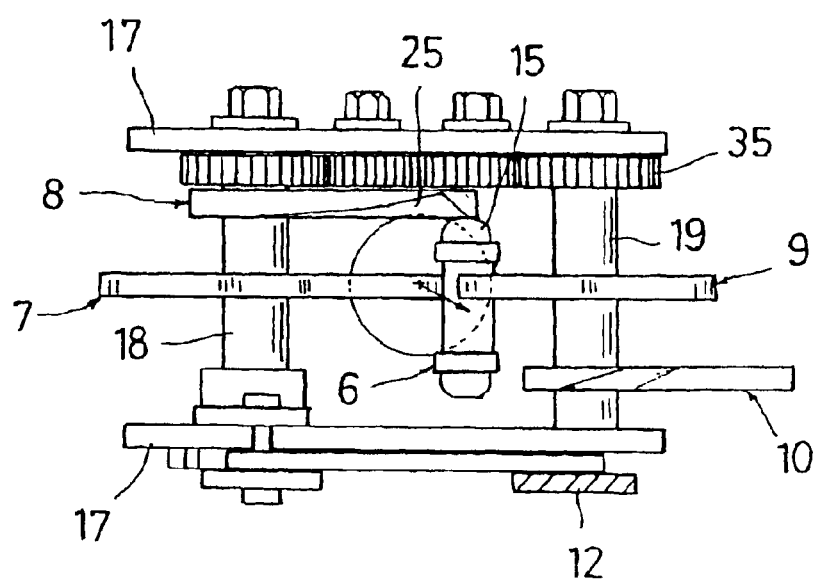
FIG. 22 is a plan view showing a second-gear state in a first embodiment of the present invention.

When shifting into second-speed from first-speed, as illustrated in FIGS. 21 and 22, by pressing the operation lever 12 backward and causing it to rotate, the first and second axles 18, 19 rotate at 45 degrees by the rotation mechanism 38, and the roller 16 of the 6 is allowed to move backwardly by the thrust part 22 of the first cam 7. After that, the gear is shifted as the gearshift 6 is moved to the left by the second cam 8.

Figure 23:
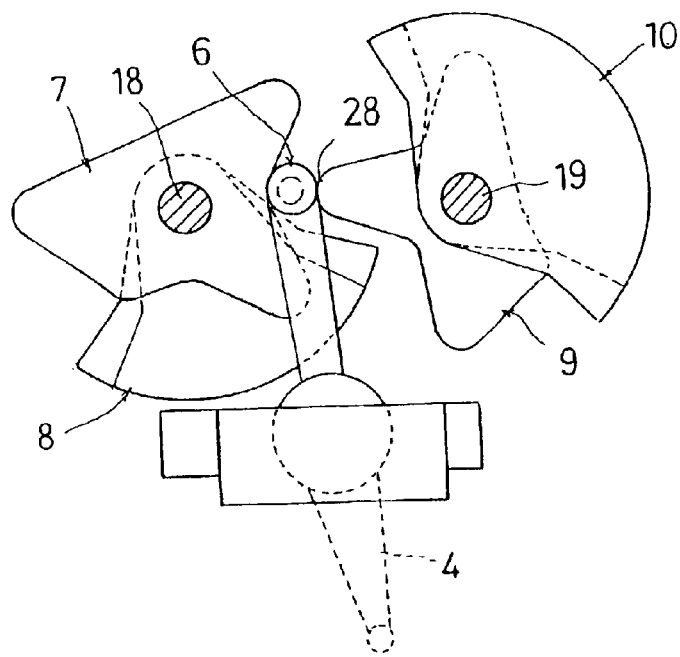
FIG. 23 is a side view showing a third-gear state in a first embodiment of the present invention.
Figure 24:
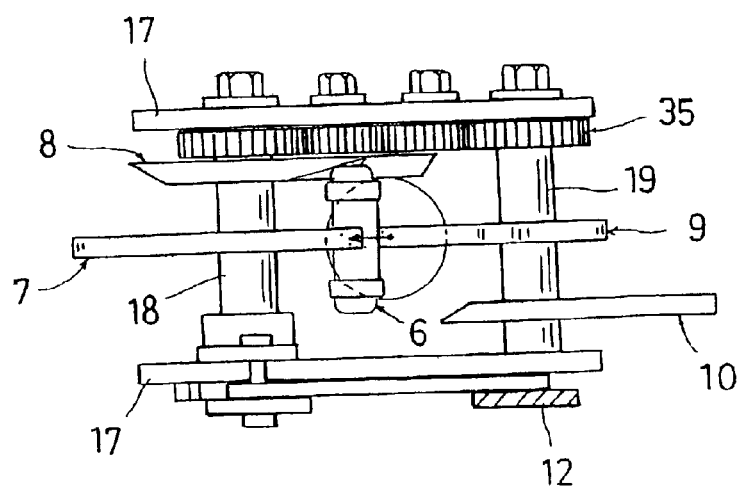
FIG. 24 is a plan view showing a third-gear state in a first embodiment of the present invention.

When shifting into third-speed from second-speed, as illustrated in FIGS. 23 and 24, due to pressing the operation lever 12 backwards and causing it to rotate, the roller 16 of the gearshift 6 is allowed to move to the forward direction by the thrust part 28 of the third cam 9. After that, the gear is shifted as the second cam 8 has cancelled its pressing force against the gearshift 6.

Figure 25:
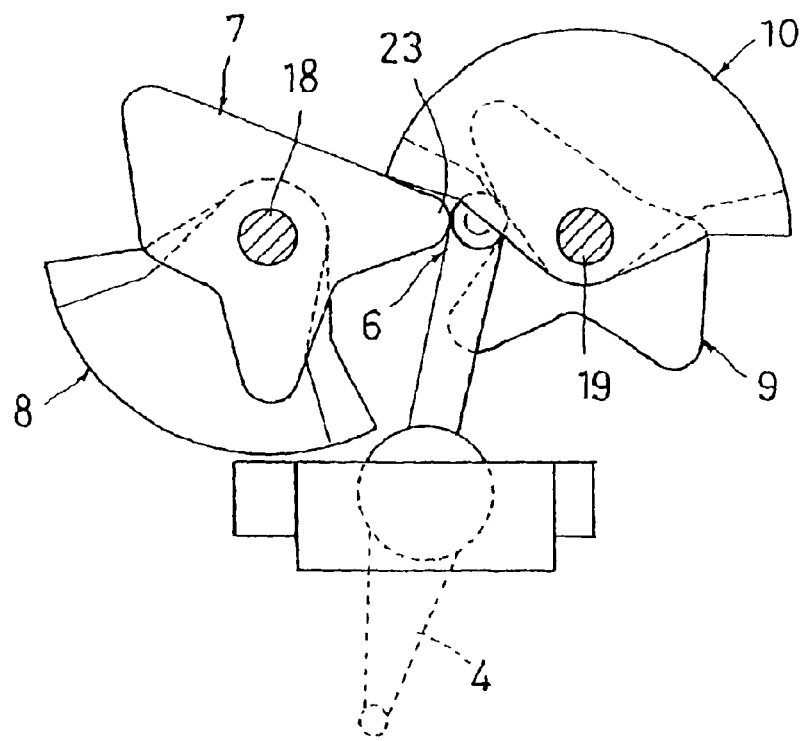
FIG. 25 is a side view showing a fourth-gear state in a first embodiment of the present invention.
Figure 26:
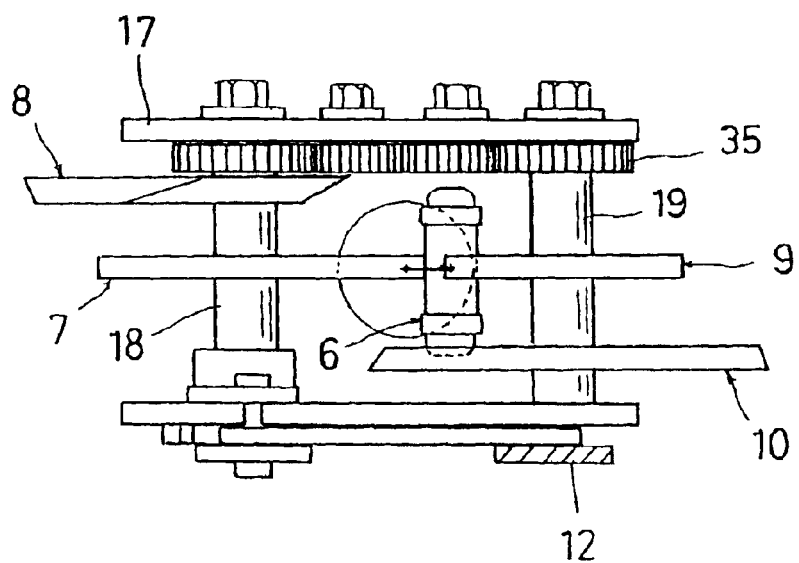
FIG. 26 is a plan view showing a fourth-gear state in a first embodiment of the present invention.

When shifting into fourth-speed from third-speed, as illustrated in FIGS. 25 and 26, due to pressing the operation lever 12 backwardly and causing it to rotate, the roller 16 of the gearshift 6 is allowed to move to the backward direction by the thrust part 23 of the first cam 7. After that, the gear is shifted as the guide 15 located at left side of the gearshift 6 is pressed by the thrust part 30 of the fourth cam 10 so as to move the gearshift 6 to the right.

Figure 27:
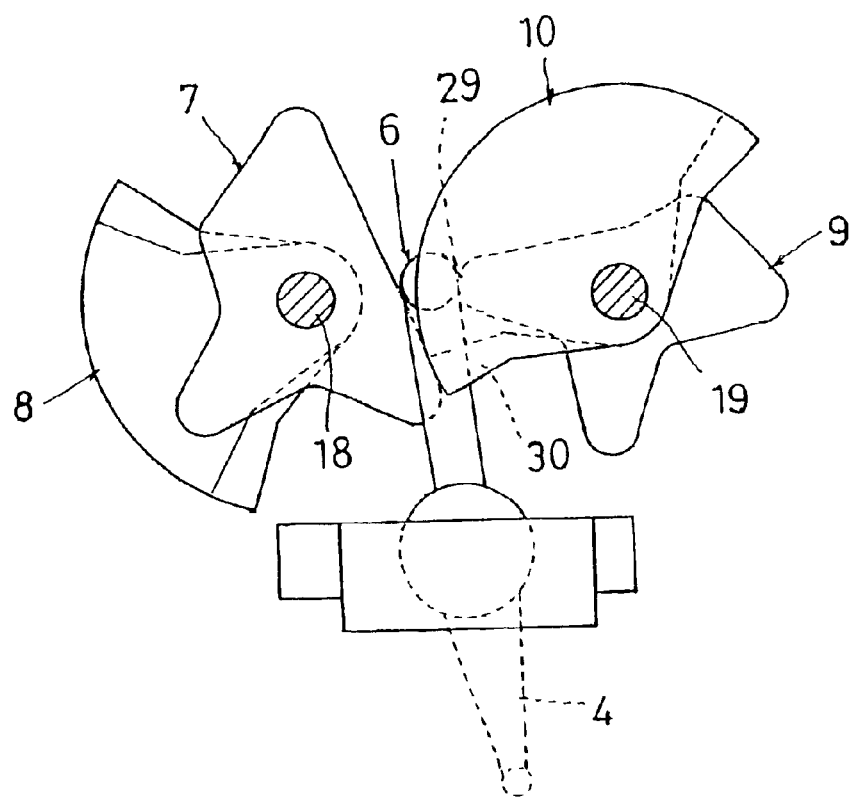
FIG. 27 is a side view showing a fifth-gear state in a first embodiment of the present invention.
Figure 28:
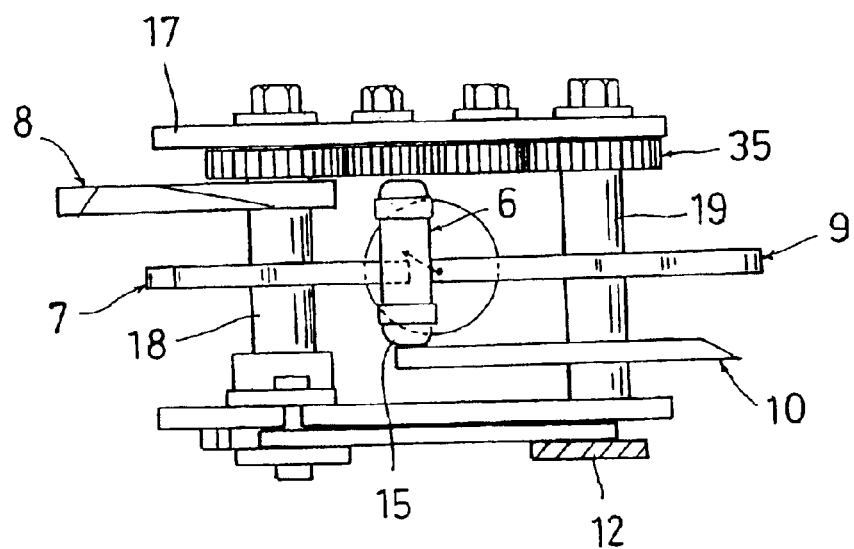
FIG. 28 is a plan view showing a fifth-gear state in a first embodiment of the present invention.

When shifting into fifth-speed from fourth-speed, as illustrated in FIGS. 27 and 28, the operation lever 12 is pressed backwardly and caused to rotate, causing the thrust part 30 of the fourth cam 10 to press against the thrust part 23 of the first cam 7, and the gear is shifted as the roller 16 of the gearshift 6 is caused to move to the forward direction by the thrust part 29 of the third cam 9.

In addition, in shifting the gear down, that is fifth-speed to the neutral stage in order, by pressing the operation lever 12 to the forward direction for each incremental shift, the first and second axles are caused to rotate in the opposite direction than they do when the shift up between the same two gears occurs.

Other embodiments of the present invention will now be described referring to FIGS. 29–77. Throughout the drawings of the embodiments, like components are denoted by like numerals as the components of the first embodiment are denoted and will not be further explained in great detail.

Figure 29:
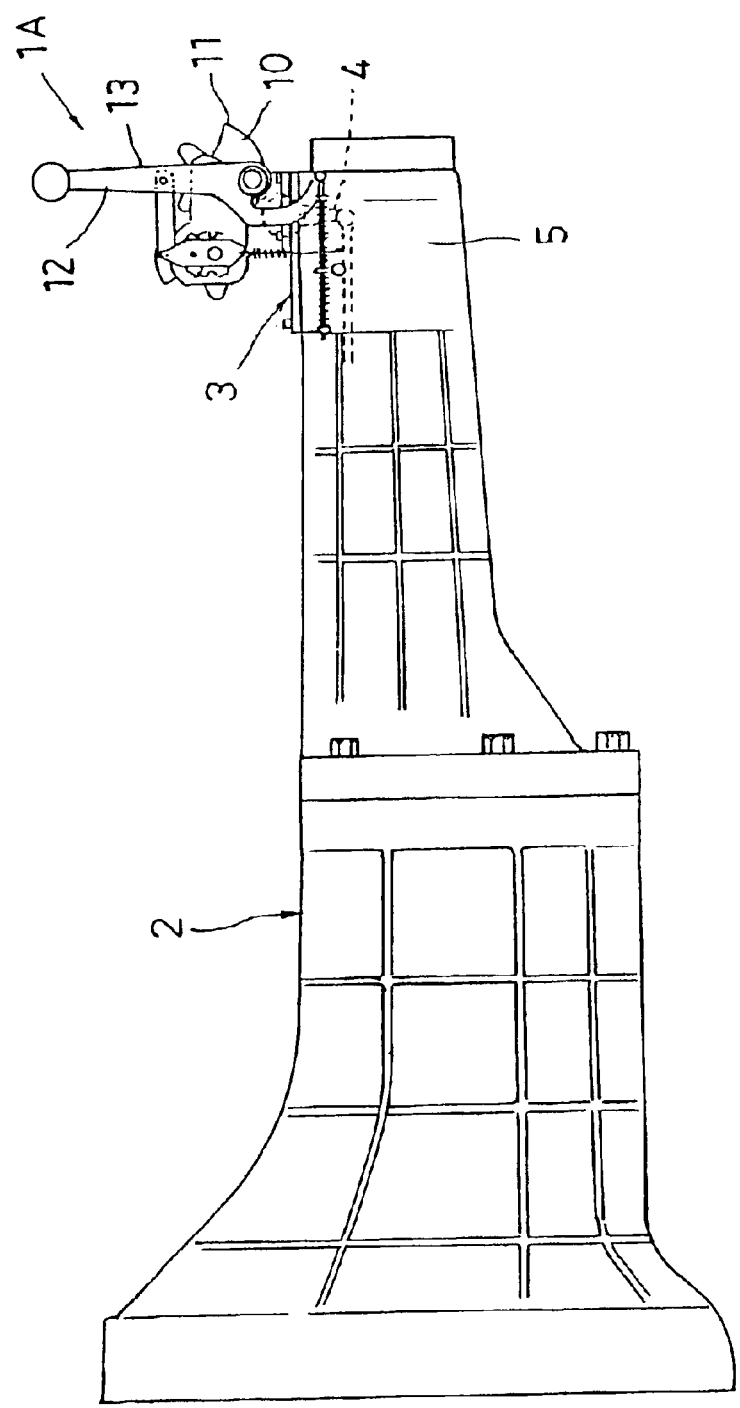
FIG. 29 is a side view showing the manner in which a gearshift-handling mechanism of the gearshift is attached in a second embodiment of the present invention.
Figure 30:
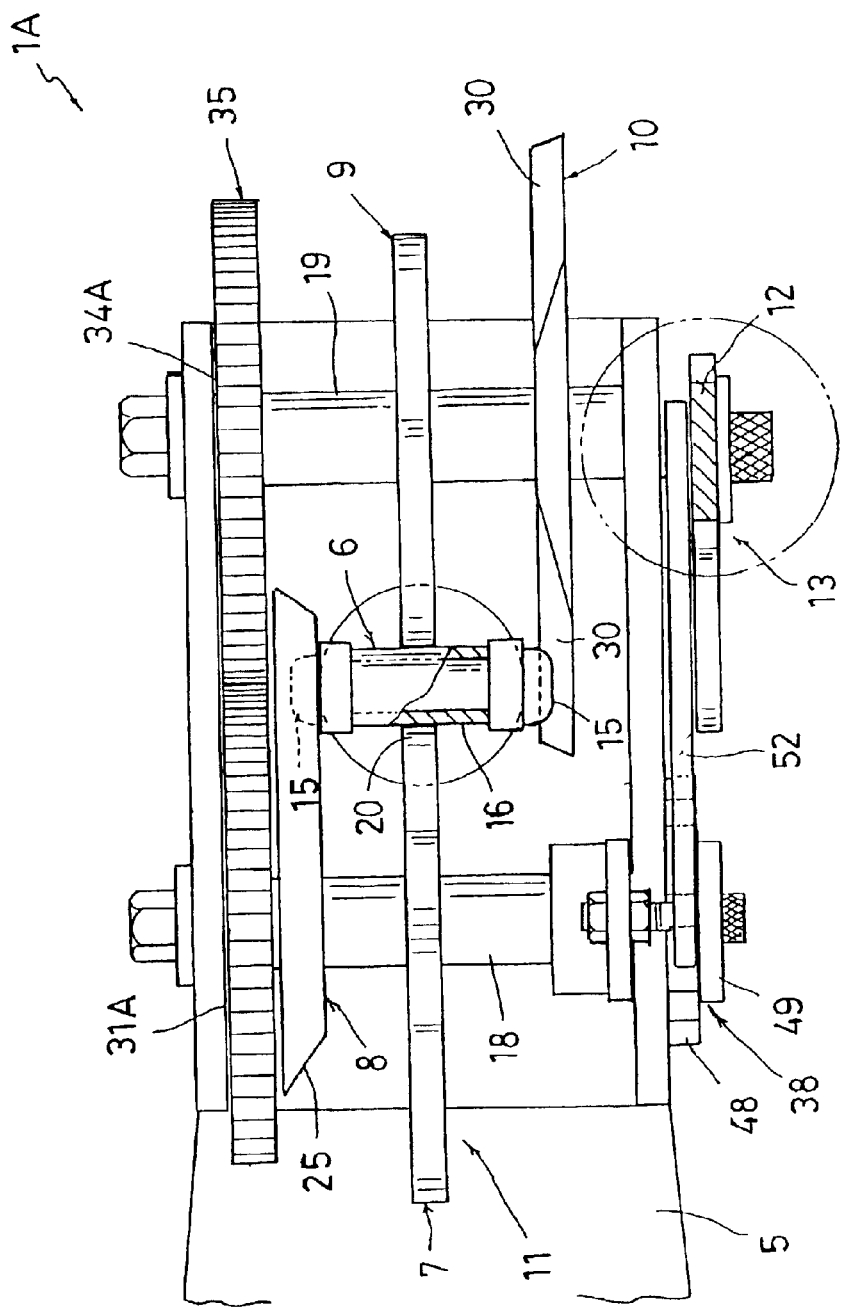
FIG. 30 is a plan view of the second embodiment of the present invention.
Figure 31:
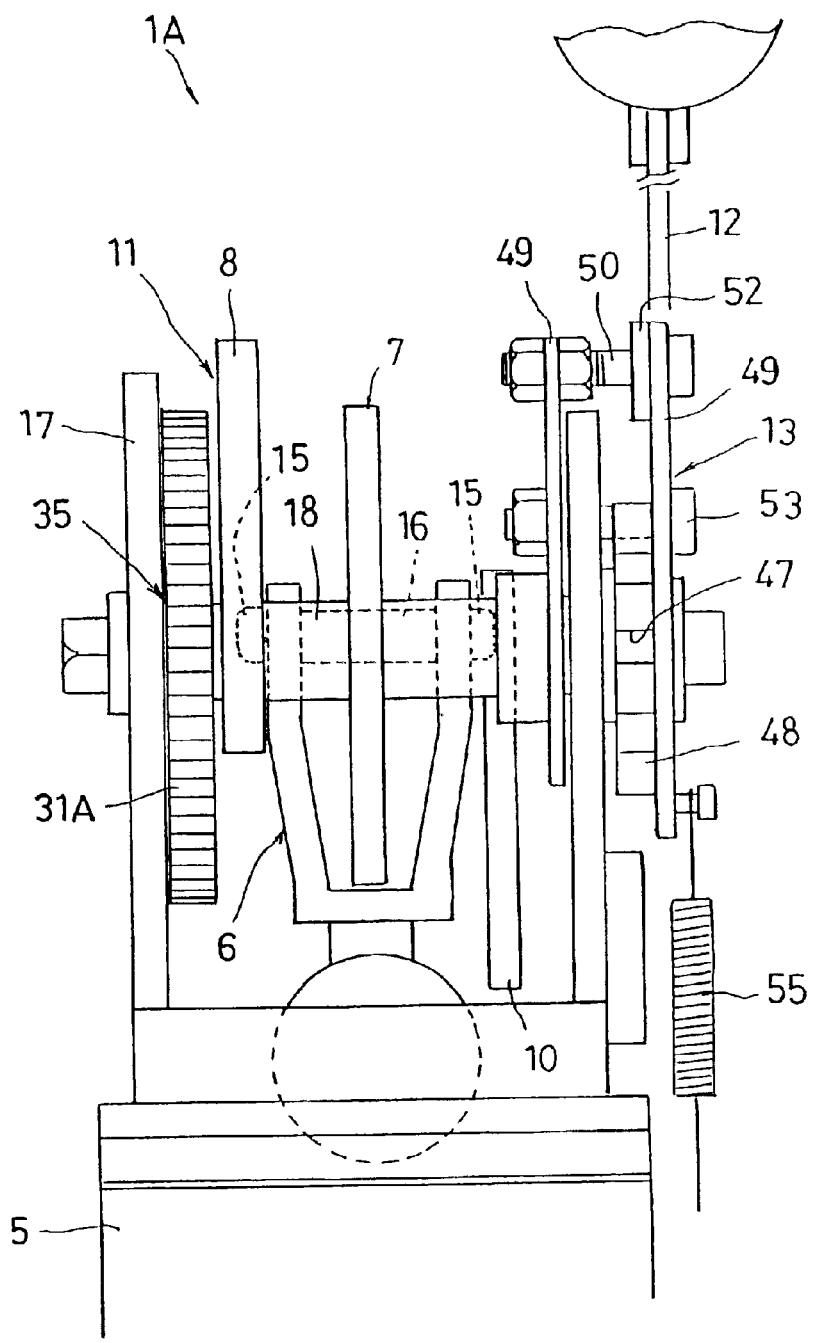
FIG. 31 is a front view of the second embodiment of the present invention.

A second embodiment of the present invention is illustrated in FIGS. 29–31. It is distinguished from the first embodiment by the fact that the first axle 18 and second axle 19 are connected rotatably by a gear 31 A and a gear 34A. A gearshift-handling mechanism 1A of the gearshift 6 according to the second embodiment has similar advantages to that of the first embodiment.

Figure 32:
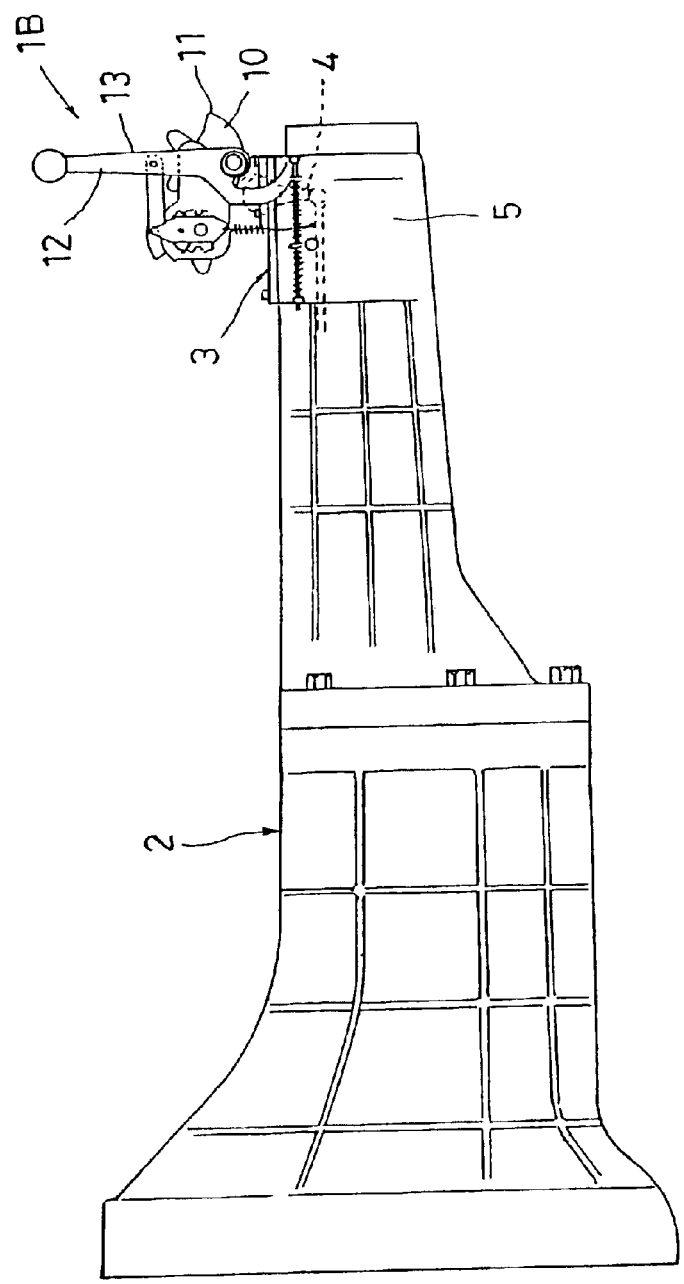
FIG. 32 is a side view showing the manner in which a gearshift-handling mechanism of the gearshift is attached in a third embodiment of the present invention.
Figure 33:
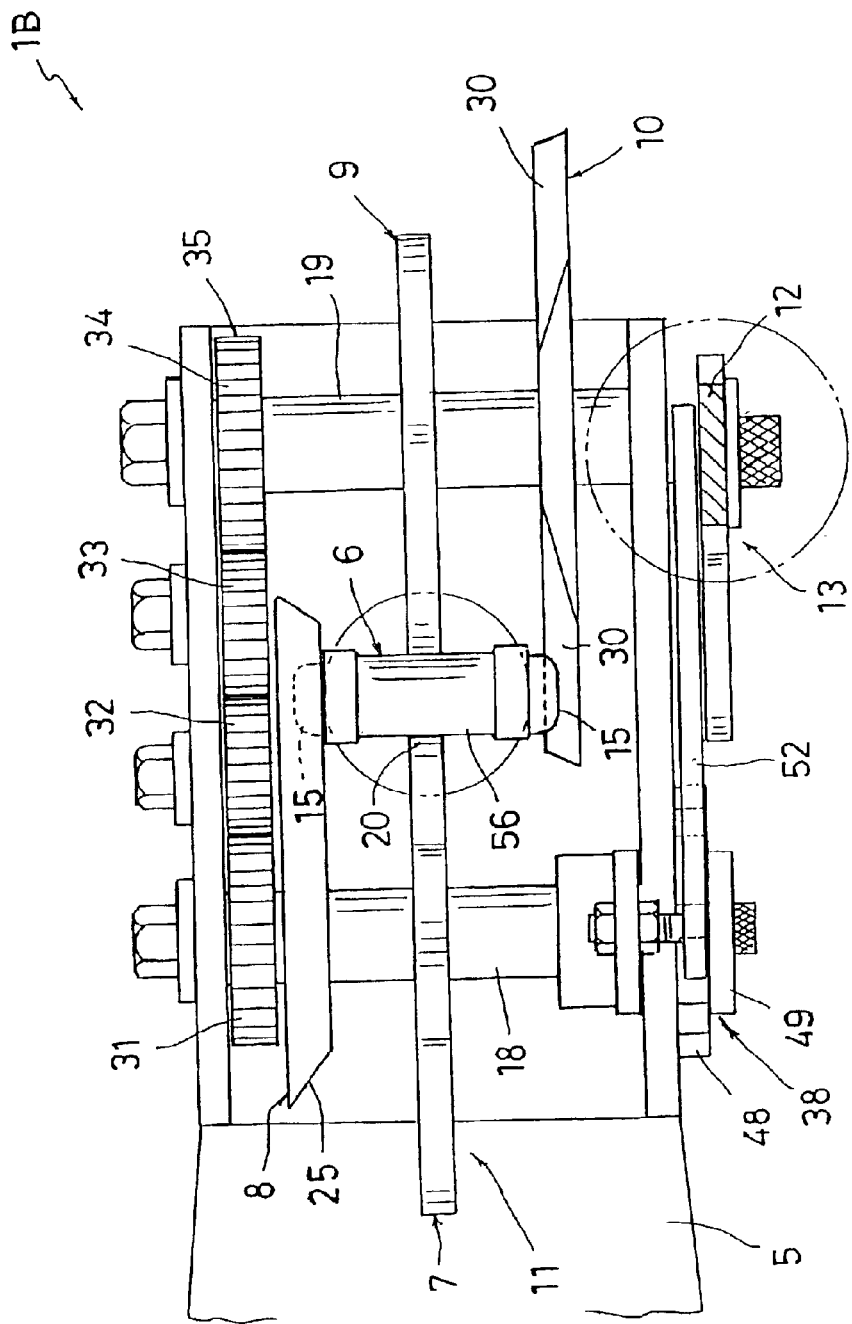
FIG. 33 is a plan view of the third embodiment of the present invention.
Figure 34:
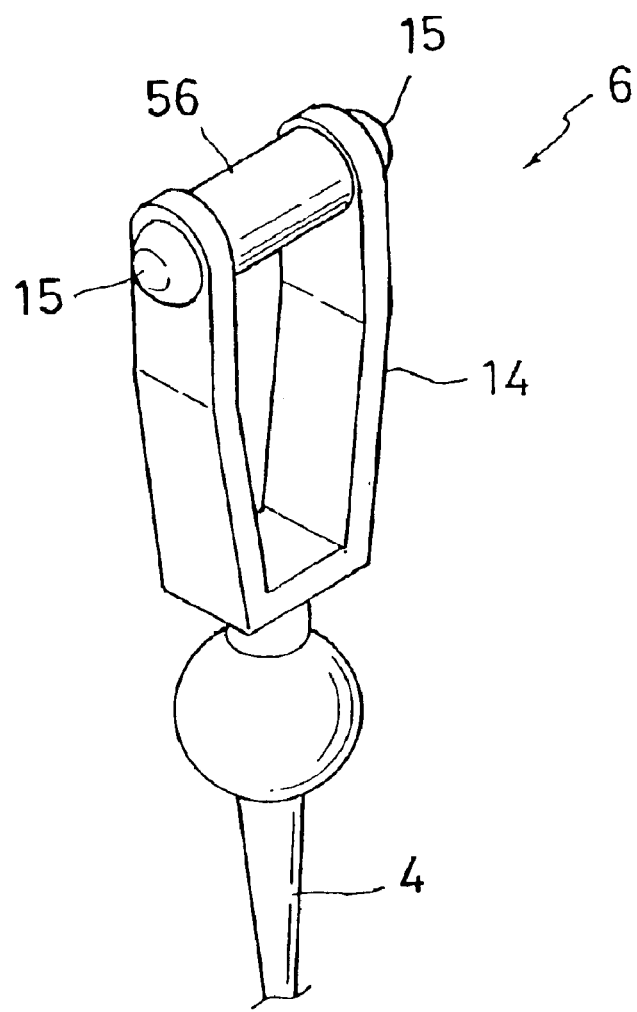
FIG. 34 is an explanation view of a gearshift in the third embodiment of the present invention.
Figure 35:
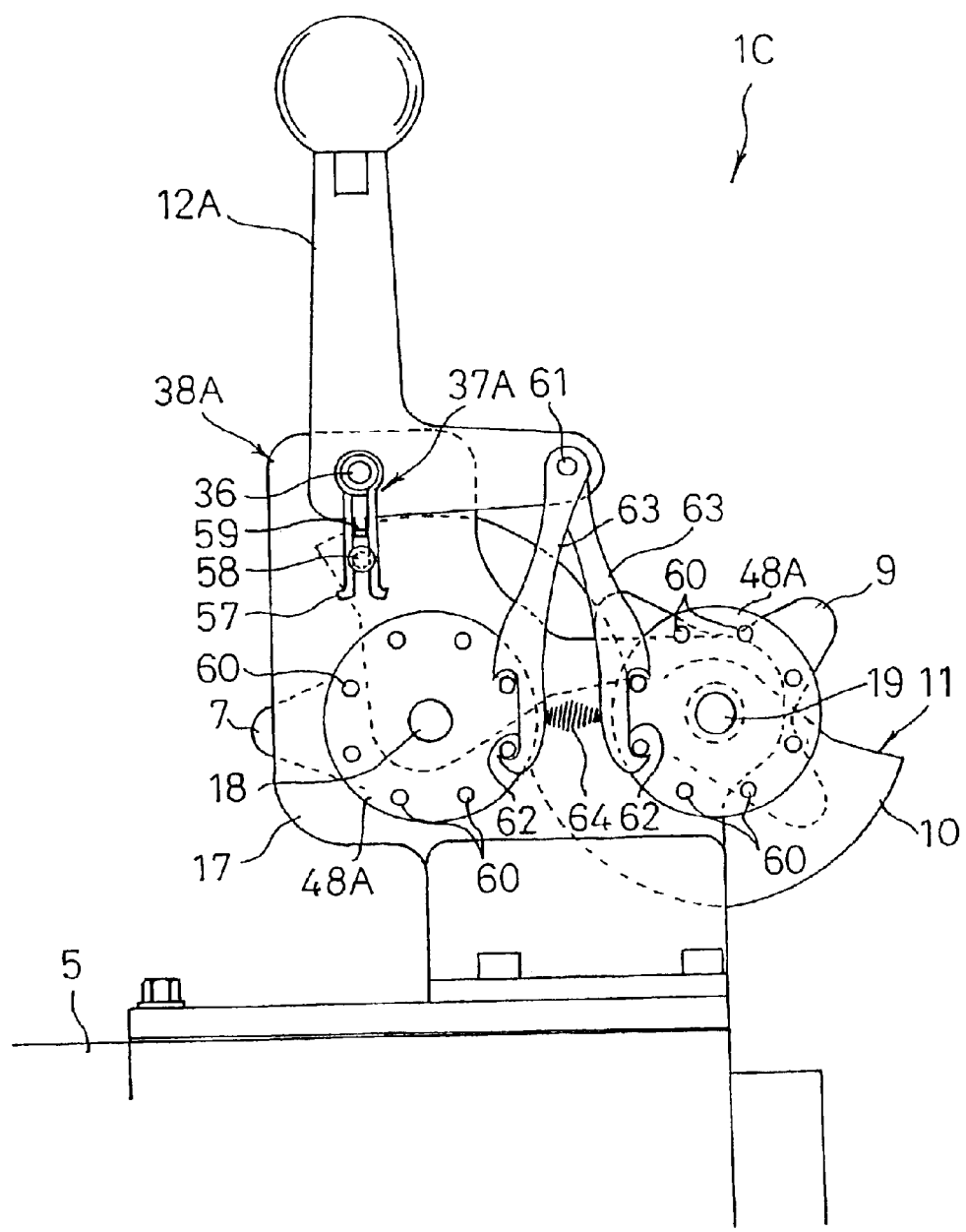
FIG. 35 is a side view showing the manner in which a gearshift-handling mechanism of the gearshift is attached in a fourth embodiment of the present invention.
Figure 36:
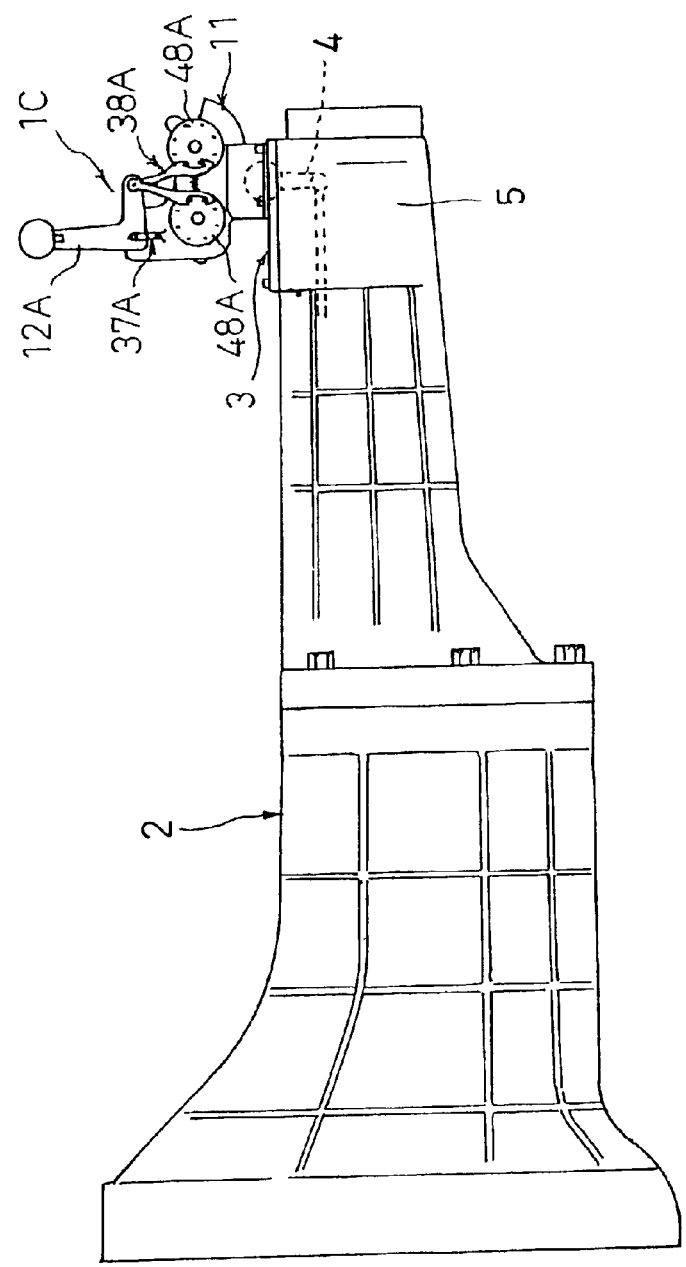
FIG. 36 is a side view of the fourth embodiment of the present invention.
Figure 37:
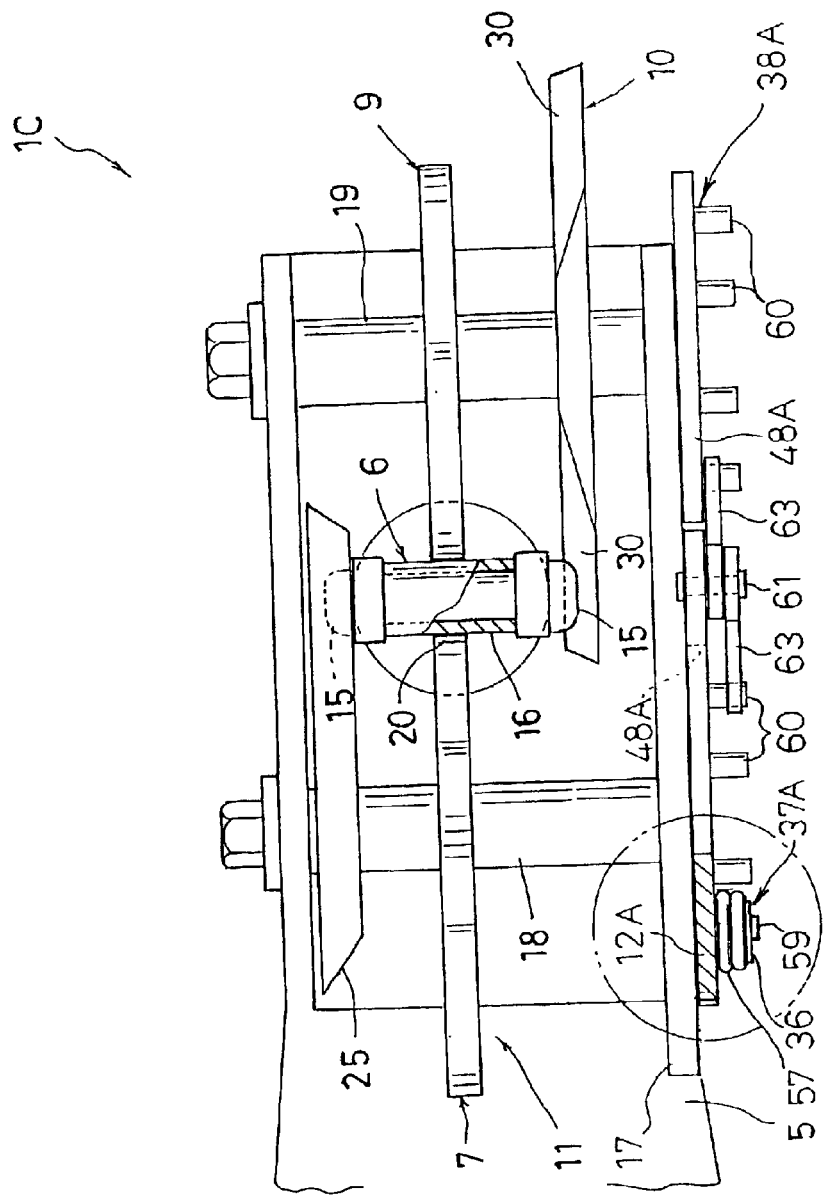
FIG. 37 is a plan view of the fourth embodiment of the present invention.
Figure 38:
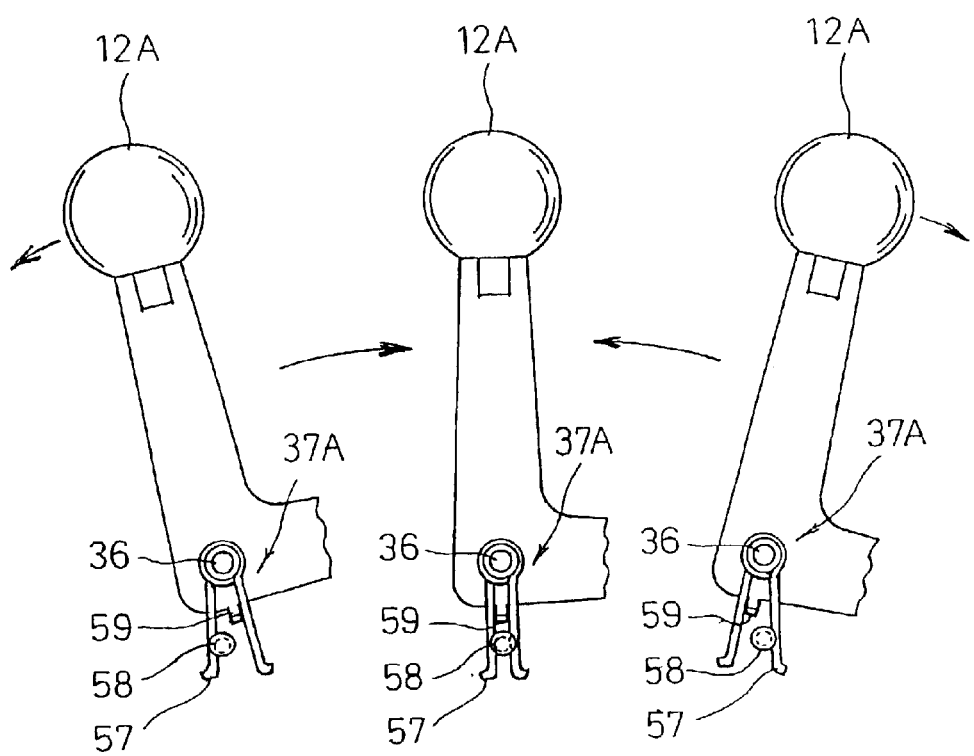
FIG. 38 is an explanation view of an auto-return mechanism for an operation lever showing the fourth embodiment of the present invention.
Figure 39:
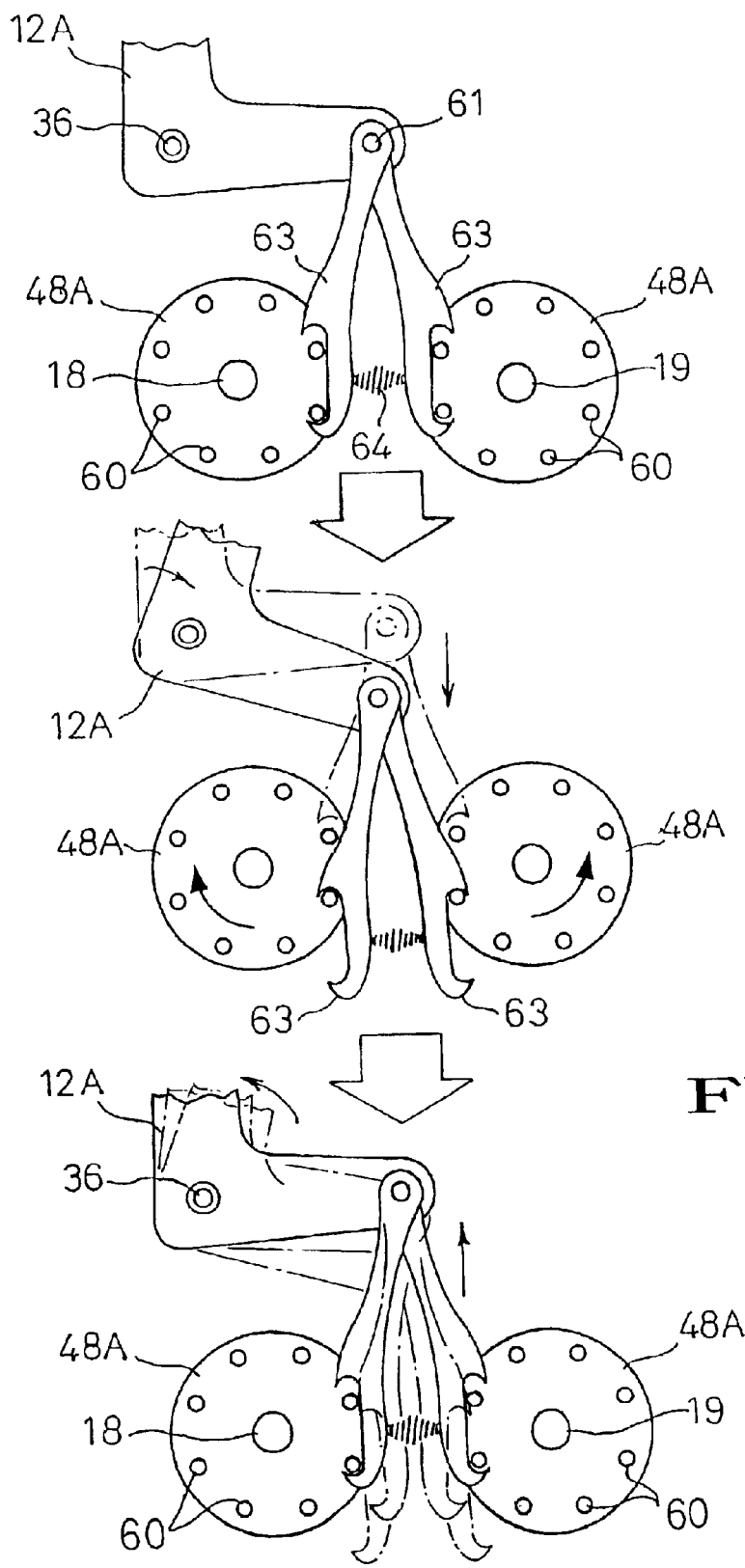
FIG. 39 is an explanation view of a rotation mechanism when shifting the gear up.
Figure 40:
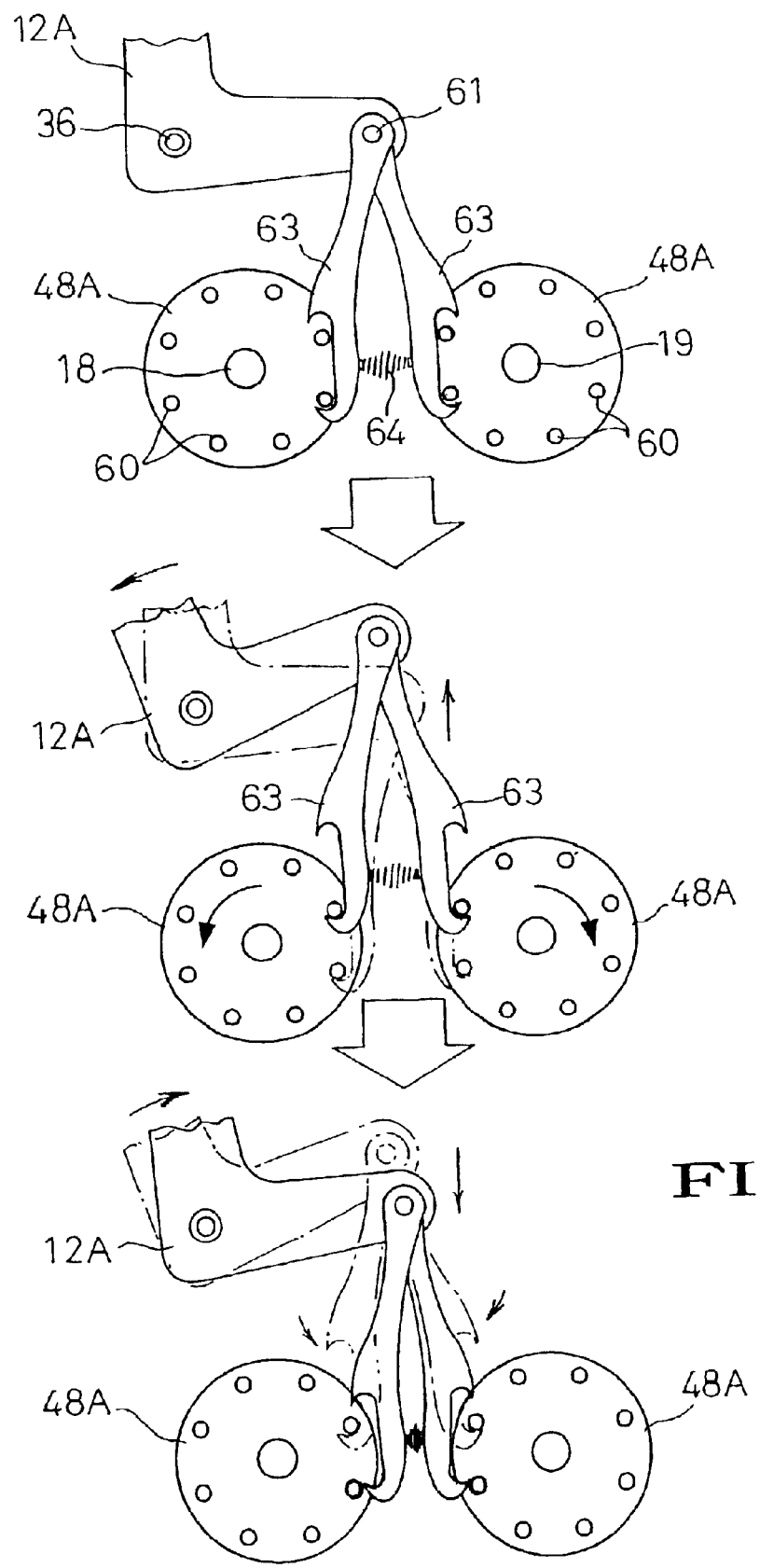
FIG. 40 is an explanation view of a rotation mechanism when shifting the gear down.
Figure 41:
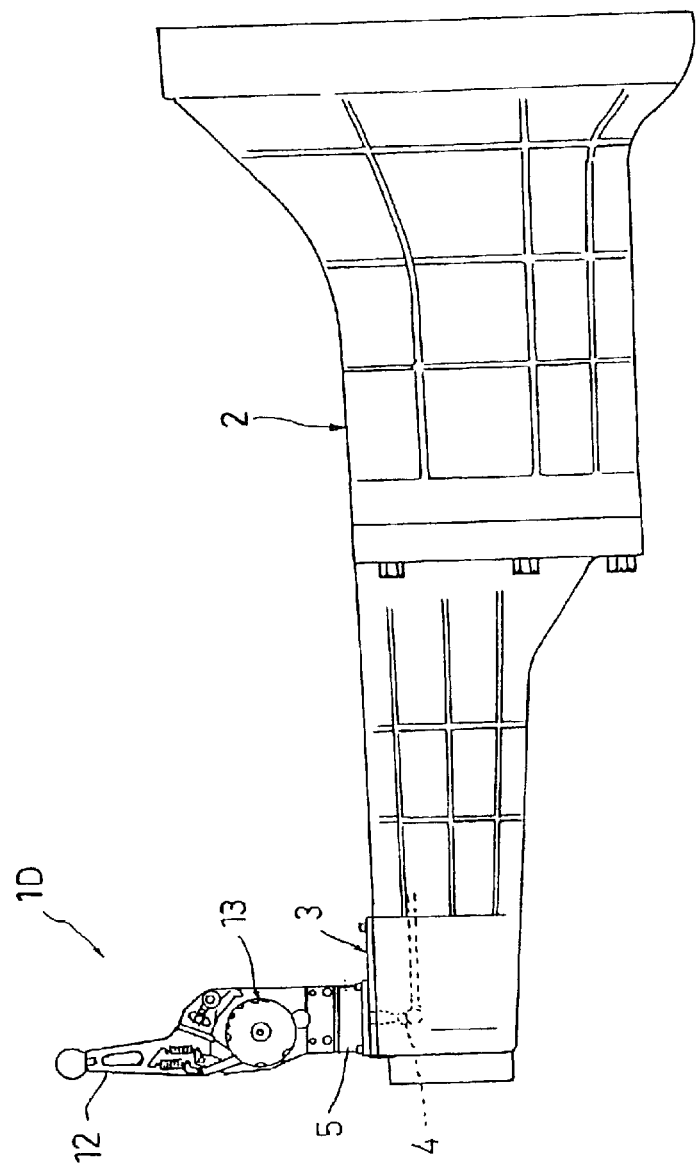
FIG. 41 is a side view showing the manner in which a gearshift-handling mechanism of the gearshift is attached in the fifth embodiment of the present invention.
Figure 42:
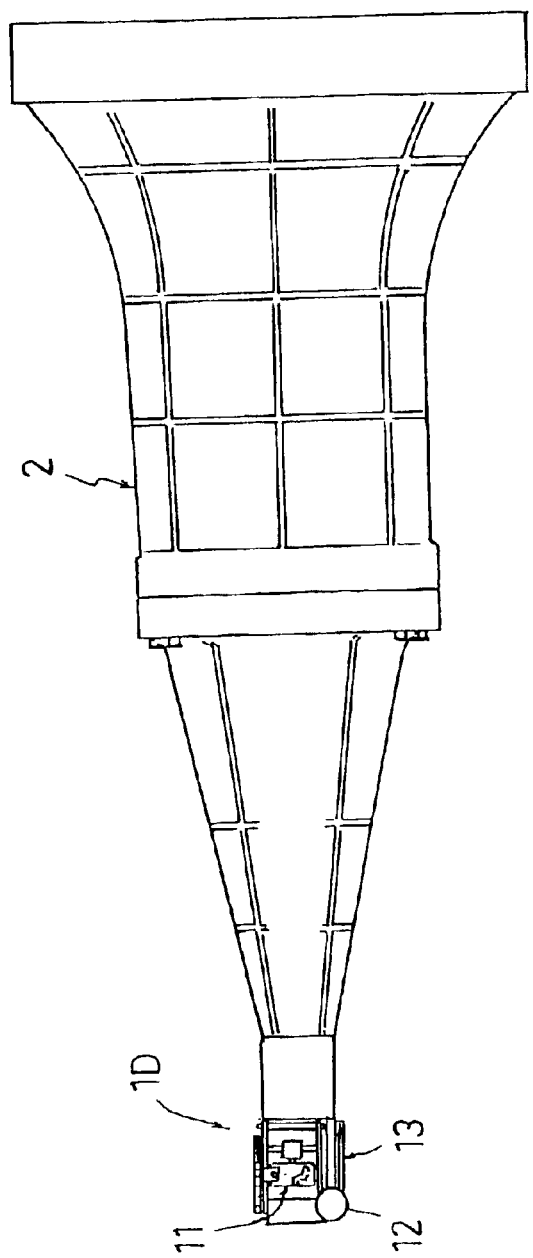
FIG. 42 is a plan view showing the manner in which a gearshift-handling mechanism of the gearshift is attached in the fifth embodiment of the present invention.
Figure 43:
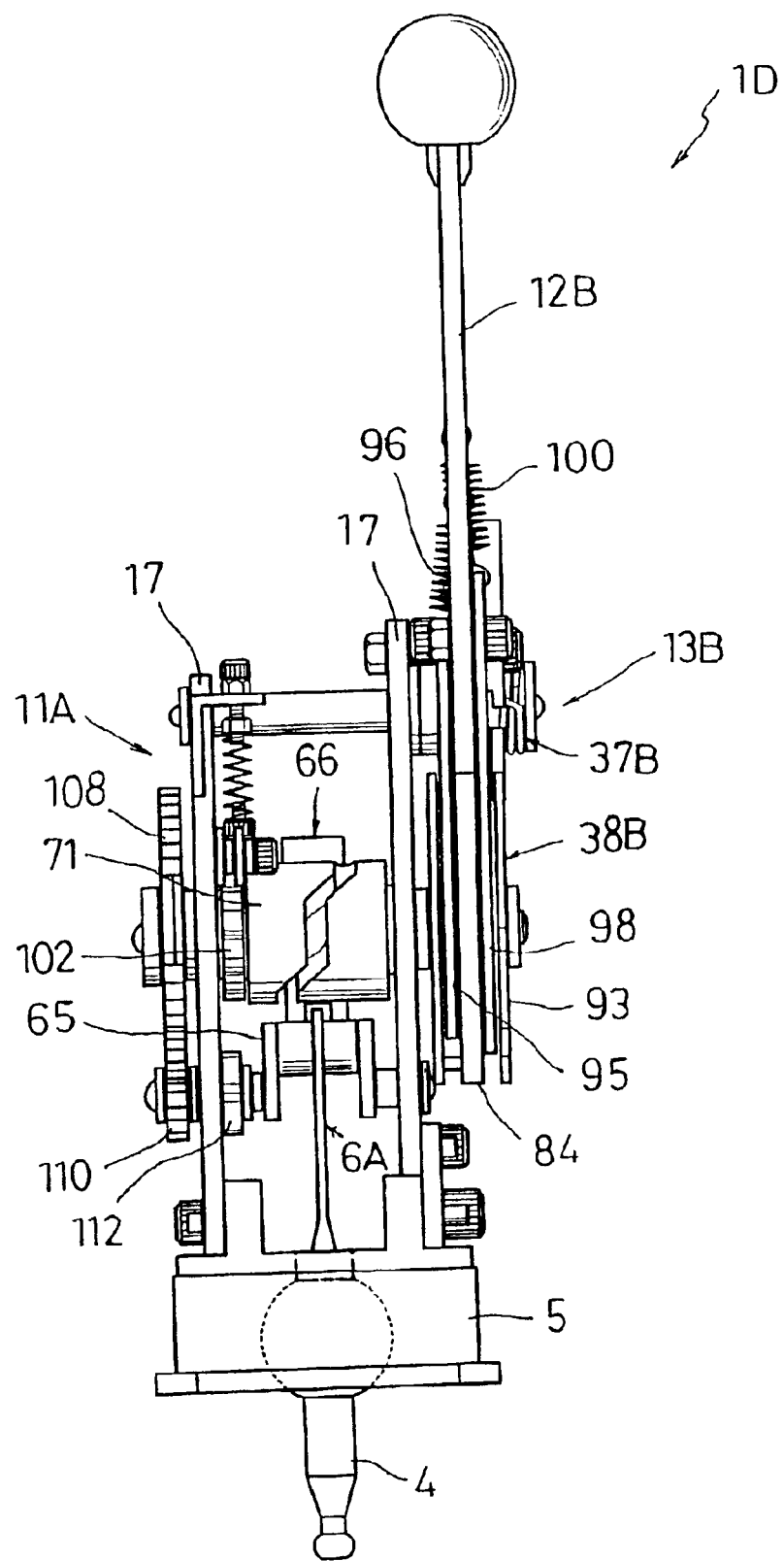
FIG. 43 is a front view of the fifth embodiment of the present invention.
Figure 44:
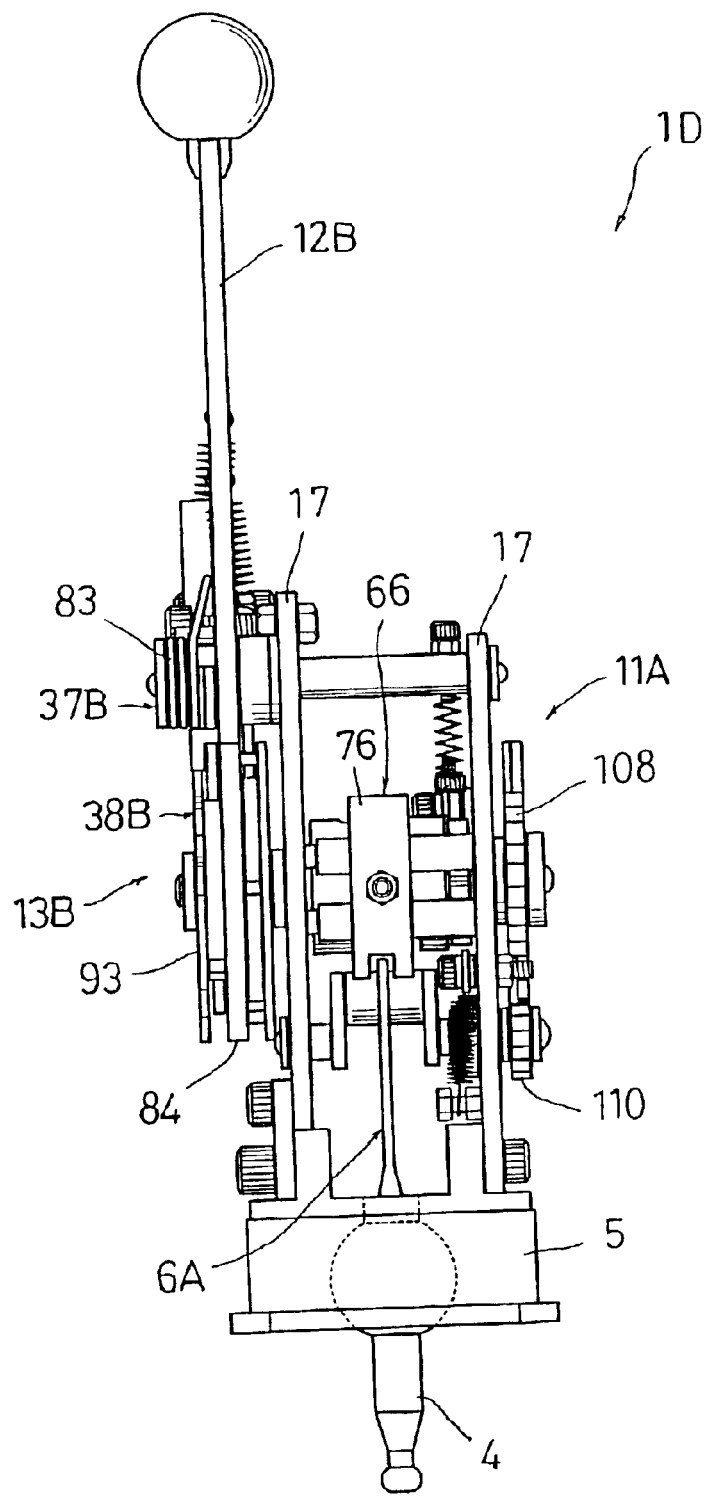
FIG. 44 is a back view of the fifth embodiment of the present invention.
Figure 45:
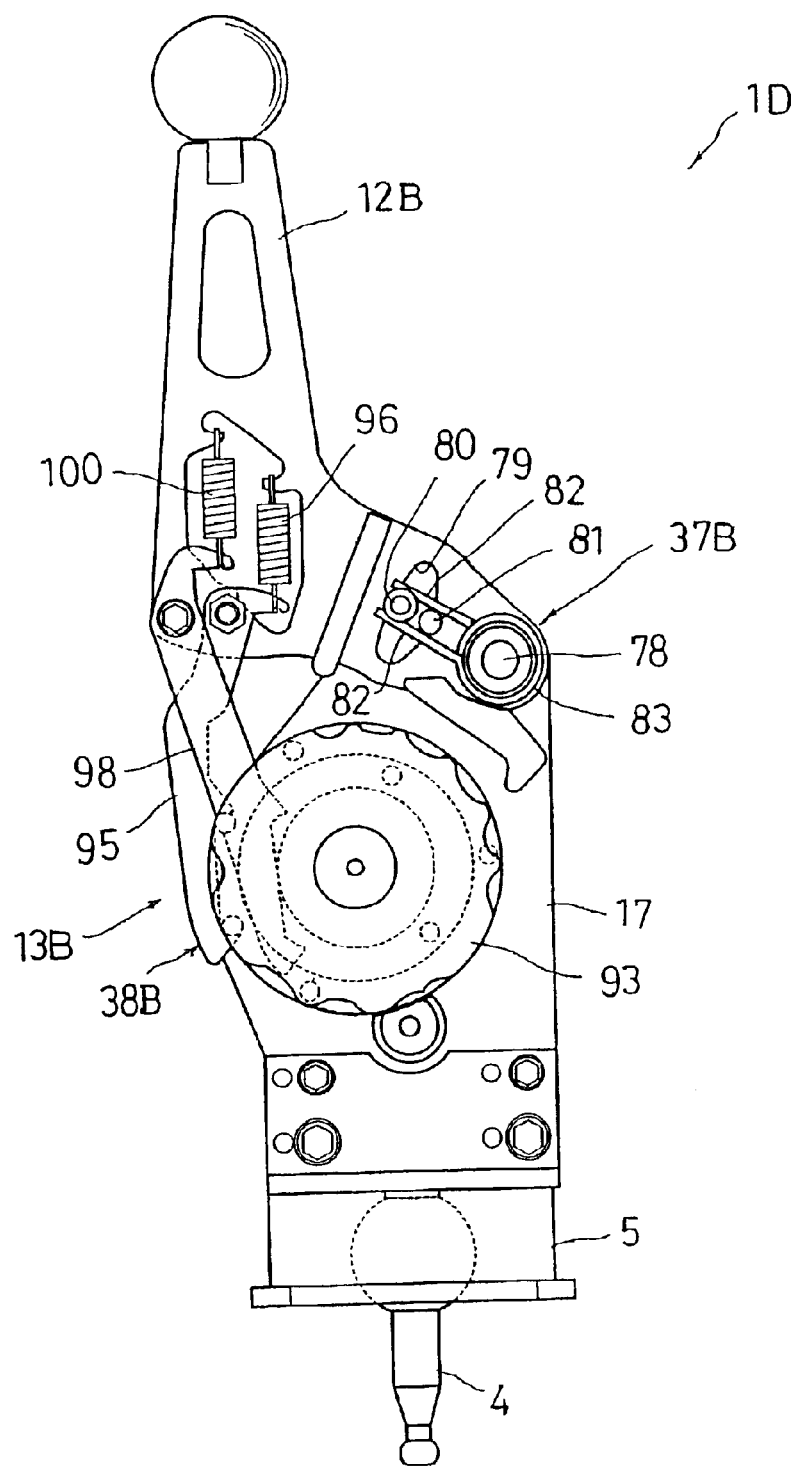
FIG. 45 is a right side view of the fifth embodiment of the present invention.
Figure 46:
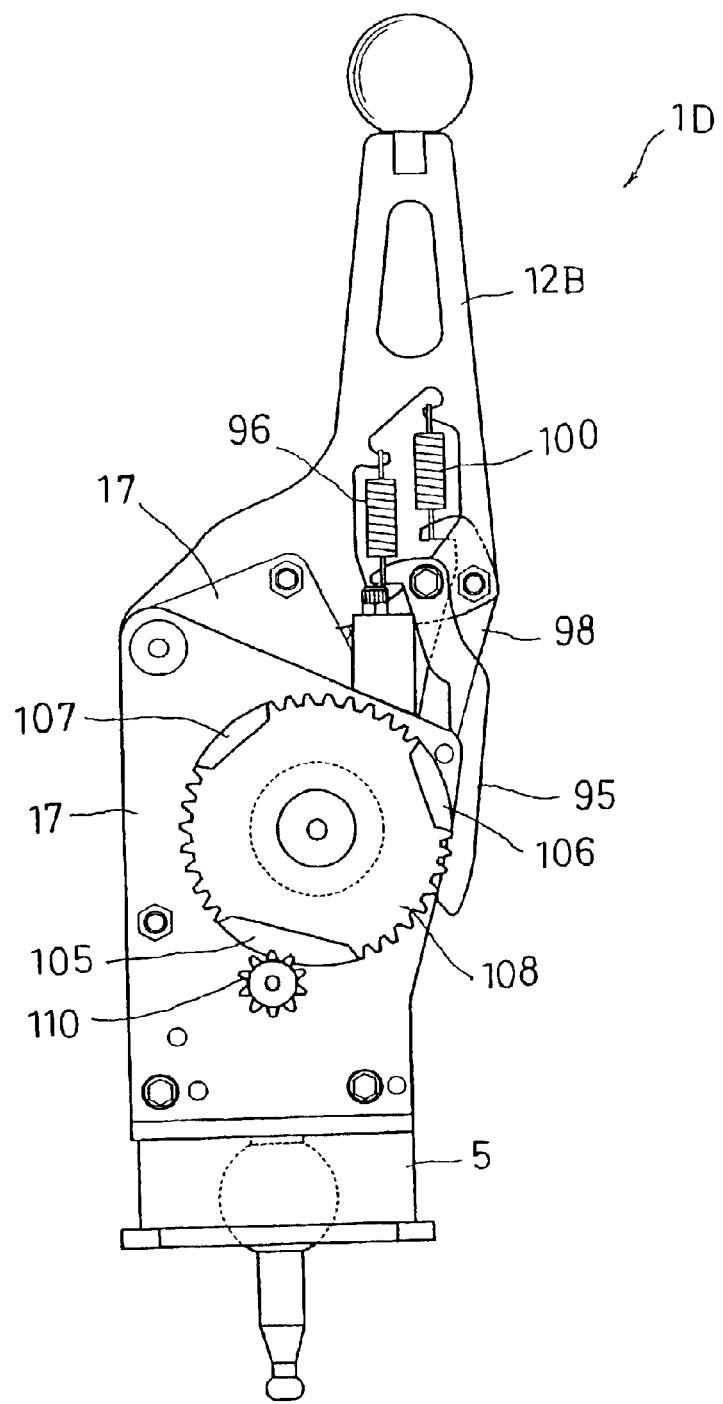
FIG. 46 is a left side view of the fifth embodiment of the present invention.

A third embodiment of the present invention is illustrated in FIGS. 32–34. It is distinguished from the first embodiment by the fact that a thrust rod 56 is fixedly attached between the guides 15, in the shape of a stick. A gearshift-handling mechanism 1B of the gearshift 6 according to the third embodiment has similar advantages to that of the first embodiment.

A fourth embodiment of the present invention is illustrated in FIGS. 35–40. It is distinguished from the first embodiment by the fact that the operation mechanism 13 is replaced by another operation mechanism 13A. The operation mechanism 13A consists of an operation lever 12A, an auto-return mechanism 37A and rotation mechanism 38A. The operation lever 12A formed in the shape of the letter L is supported rotatably at one of the support boards 17 such that it is capable of movement to the forward and backward directions, being supported at the corner thereof by the pivot pin 36. The auto-return mechanism 37A further includes a spring 57, spring engagement pin 58 and spring engagement pin 59 of the lever-side.

The spring 57 is fixed by the pivot pin 36, both ends of the spring 57 projecting in the shape of an arm and downward, and the spring 57 further having the force to return automatically the operation lever 12A to the initial center position after the operation lever 12A is moved in either the forward or backward directions from the initial center position and released. The spring engagement pin 58 is fixed to one of the support boards 17 so as to be located between portions of the projecting arm-shaped ends of the spring 57. The spring engagement pin 59 of the lever-side is provided between the spring 57 and a portion adjacent the corner of the operation lever 12A.

Rotation mechanism 38A further includes a rotation board 48A, a pair of rods 63, and spring 64. The rotation boards 48A are coupled to the first and second axles 18, 19, and have a plurality of pins 60, eight pins 60 in the illustrated embodiment, fixed at a predetermined spacing to the outer portion thereof, the rotation board 48A rotating at a predetermined angle, 45 degrees in this embodiment, due to movement of the operation lever 12A to the forward or backward direction. The rods 63 are supported at the rear end of the operation lever 12A by the pivot pin 61, and have concave parts 62 which engage with two pins 60 on the rotation boards 48A when the operation lever 12 is positioned at the initial center position. The spring 64 is arranged between the rotation boards 48A, biasing the rods 63 to the direction of the rotation boards 48A.

A gearshift-handling mechanism 1C of the gearshift 6 with the operating mechanism 13A according to the third embodiment has similar advantages to that of the first embodiment.

A fifth embodiment of the present invention is illustrated in FIGS. 41–69. It is distinguished from the first embodiment by the fact that the gearshift-handling mechanism 1D of a gearshift 6 further includes a moving mechanism 11A and operating mechanism 13B.

Figure 47:
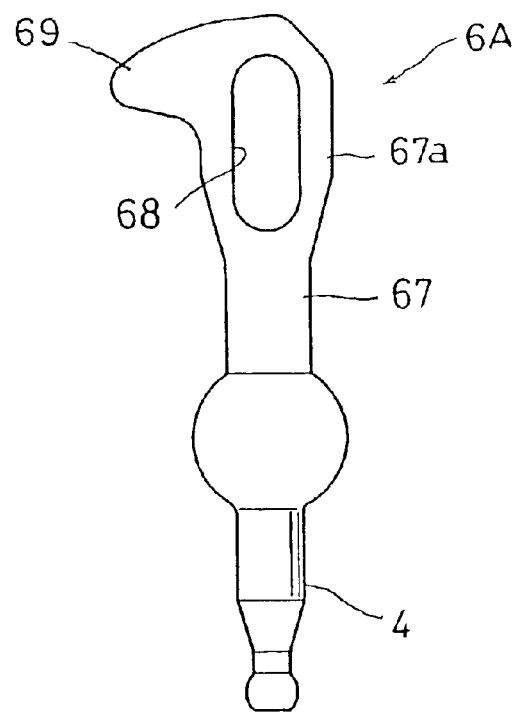
FIG. 47 is an explanation view of a gearshift in the fifth embodiment of the present invention.
Figure 48:
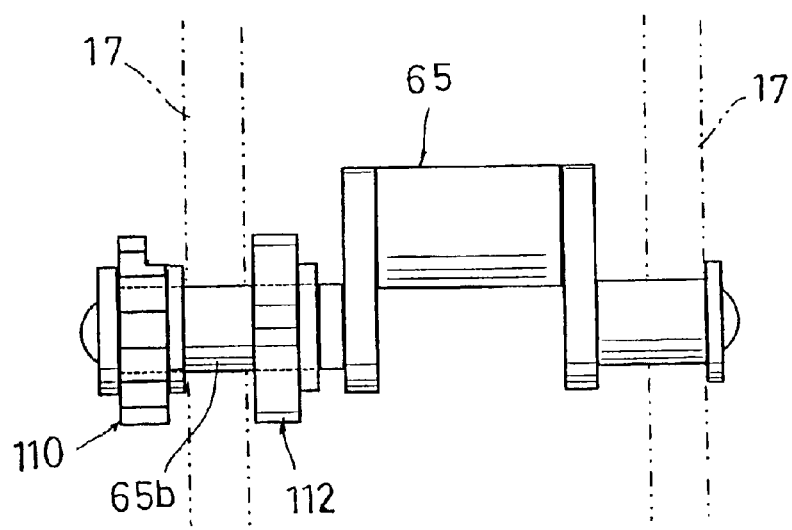
FIG. 48 is an explanation view of a forward-backward moving link.
Figure 49:
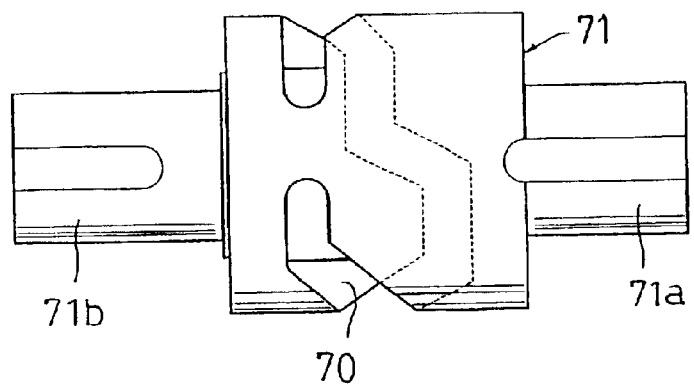
FIG. 49 is an explanation view of a right-left moving cam.
Figure 50:
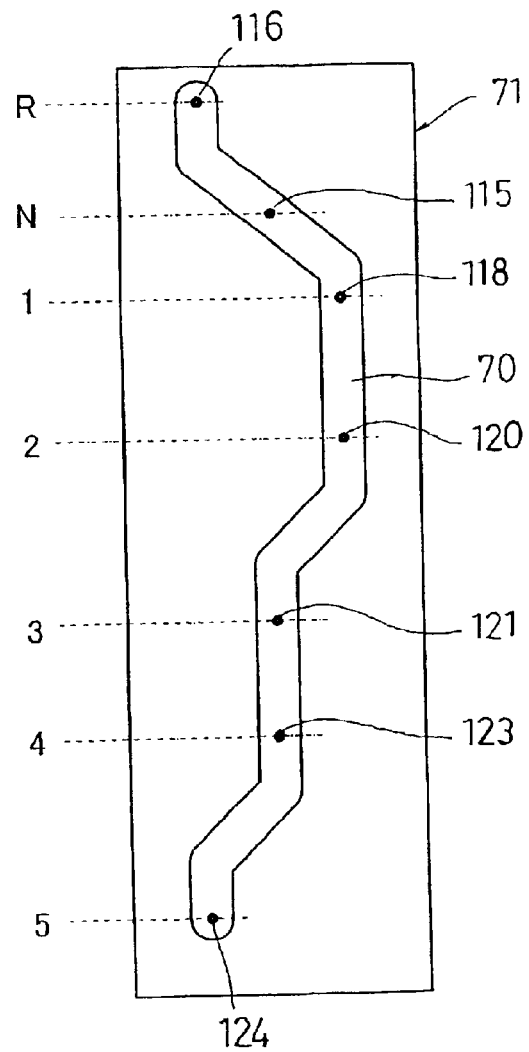
FIG. 50 is an explanation view of a shift pattern of a gear of the fifth embodiment of the present invention.
Figure 51:
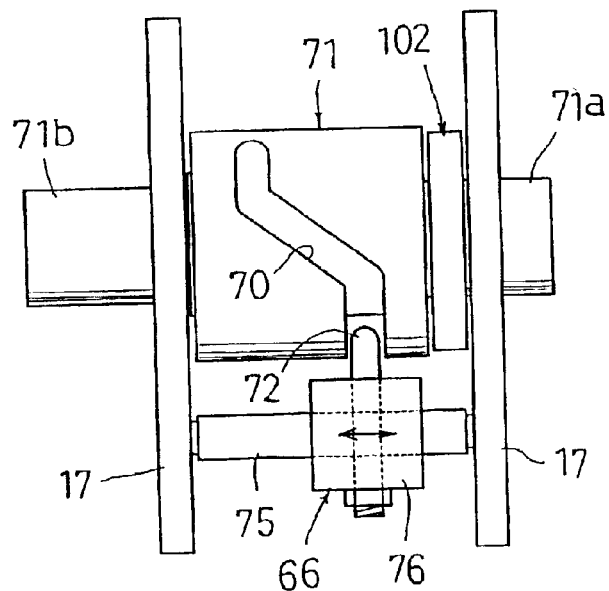
FIG. 51 is a plan view of a mechanism for the right-left moving cam.

The moving mechanism 11A includes a moving link 65 which allows the gearshift-handling mechanism 1D to move the gearshift 6A to the forward and backward directions and a moving cam mechanism 66 which allows the cams to move the gearshift 6A to the right and left directions, so that the gearshift 6A moves in a substantially H-shaped configuration. The operating mechanism 13B enables operation of the moving cam mechanism 66 and moving link 65 by controlling the operation lever 12B in the forward and backward directions and enables operation of the gearshift 6A to shift each gear, that is, reverse position, neutral position, first-speed, second-speed, third-speed, fourth-speed, or fifth-speed, As illustrated in FIG. 47, the gearshift 6A further includes a shift lever body 67, elongated hole 68 and an engagement piece 69. The elongated hole 68 is formed at a projection 67a projected from the box 5. The engagement piece 69 is formed at a projected end portion of the shift lever body 67.

In detail, the moving link 65 of the moving mechanism 11A is rotatably attached to the portion adjacent the rear part of the pair of the support boards 17 so as to allow it to move the gear shift 6A to the forward and backward directions, the moving link 65 being formed in the shape of a crank and being inserted into the elongated hole 68.

Figure 52:
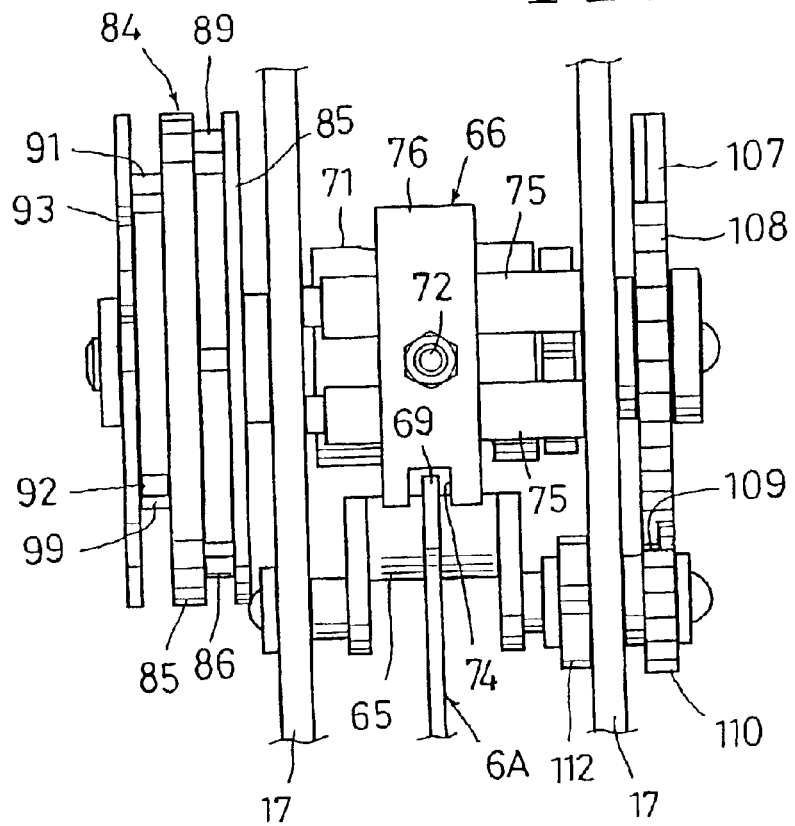
FIG. 52 is a back view of a mechanism for the right-left moving cam.
Figure 53:
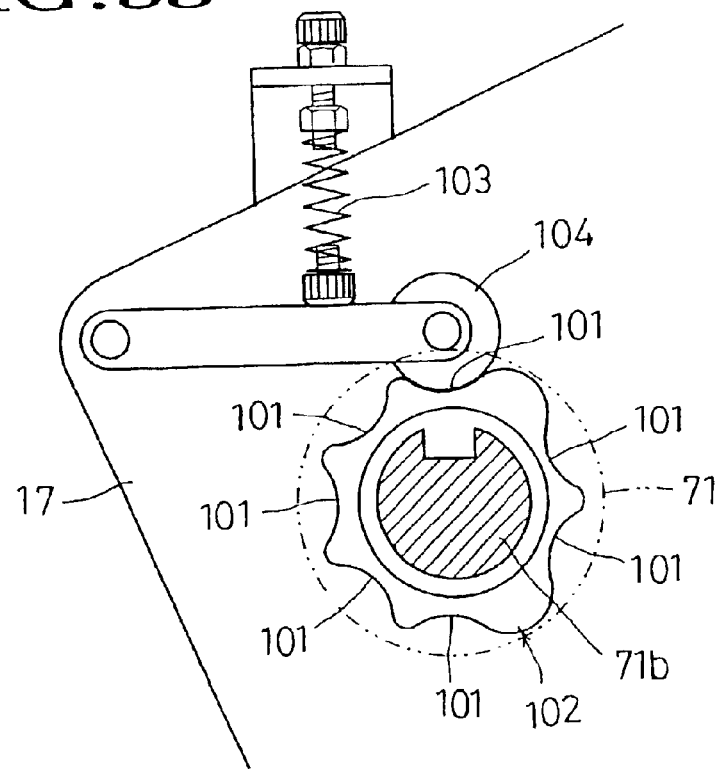
FIG. 53 an explanation view showing the manner in which a locatable cam is attached in a fifth embodiment of the present invention.
Figure 54:
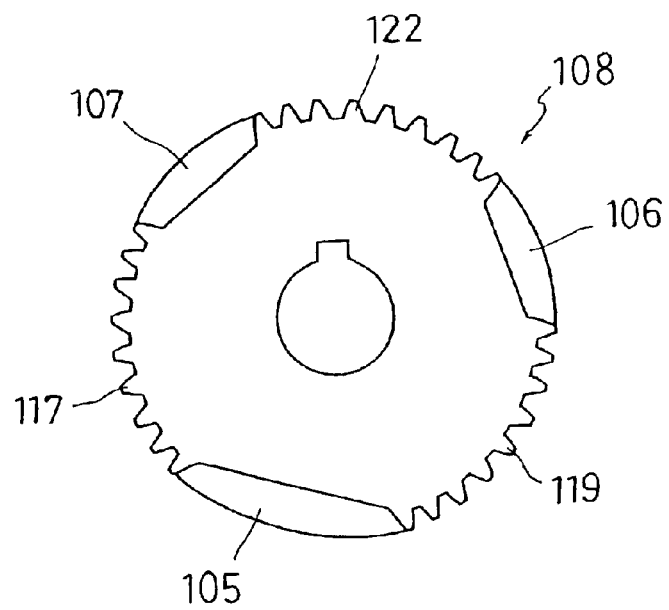
FIG. 54 is an explanation view of a gear of the fifth embodiment of the present invention.
Figure 55:
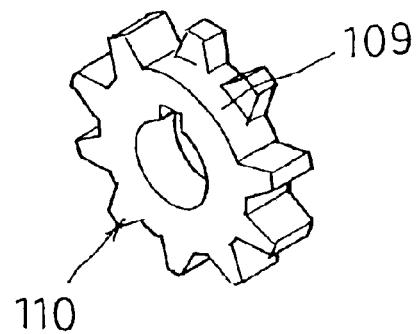
FIG. 55 is an explanation view of a pinion of the fifth embodiment of the present invention.
Figure 56:
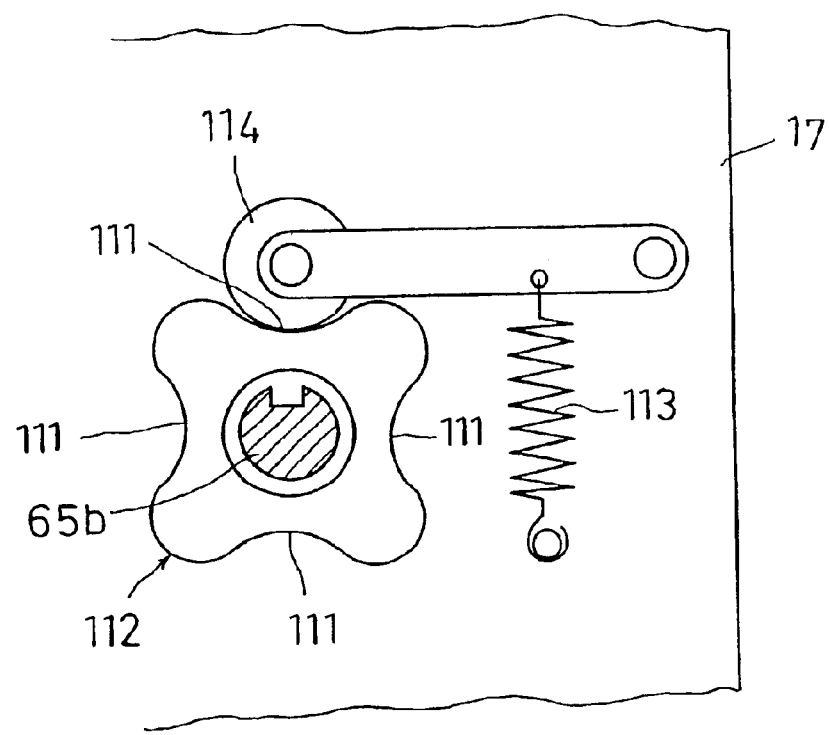
FIG. 56 is a an explanation view showing the manner in which a locatable cam is attached in a fifth embodiment of the present invention.

Moreover, the moving cam mechanism 66 of the moving mechanism 11A includes a moving cam 71 and moving body 76. As illustrated in FIG. 52, the moving cam 71 is formed with a groove, the walls of the groove defining a cam part 70, and is rotatably attached to an upper portion of the support board 17, enabling the gearshift 6A to move to the right and left directions. The moving body 76 moves slidably on the support axles 75 fixed to the support boards 17, and has a concave part 74 which engages with the engagement piece 69 of the gearshift 6A, and an engagement projection 72 which engages the cam part 70 of the moving cam 71 so that it moves the moving cam 71 to the right and left directions.

The operating mechanism 13B consists of an operation lever 12B, auto-return mechanism 37B and rotation mechanism 38B. The operation lever 12B formed in the shape of the letter L is rotatably attached near the top end of one of the support boards 17. The auto-return mechanism 37B consists of an elongated hole 79 formed adjacent to the support portion of the operation lever 12B; a support axle 80 fixed to the support board 17 to which the operation lever 12B is attached so as to pass through the elongated hole 79; a support axle 81 fixed to the operation lever 12B adjacent the center portion of the elongated hole 79; and a spring 83 attached to the center part of the support axle 78 and having bar members at both ends 80 thereof abutting the support axles 81 allowing the operation lever 12B to return automatically to its centered initial position each time it is moved either forward or backward and released. The rotation mechanism 38B allows the gearshift 6A to shift up or down a gear into reverse, neutral, first-speed, second-speed, third-speed, fourth-speed and fifth-speed in sequential order.

The rotation mechanism 38B consists of a first rotating body 84, a second rotating body 93, a first lever 95, a spring 96, a second lever 98, a spring 100, a locatable cam 102, a stopper 104, a gear 108, a pinion 110, a locatable cam 112 and a stopper 114. The first rotating body 84 includes a first engagement pin 86, second engagement pin 87, third engagement pin 88 and fourth engagement pin 89 arranged at 45 degree intervals at an outer circumferential portion between rotation board 85 which is fixed to the support axle 71a; and fifth engagement pin 90 arranged at an outer circumferential part between the first engagement pin 86 and the fourth engagement pin 89. The second rotating body 93 includes a sixth engagement pin 91 provided at a portion 45 degrees clockwise from the fourth engagement pin 89 on the outer circumferential portion thereof and a seventh engagement pin 92 arranged at a portion 45 degrees clockwise from the fifth engagement pin 90 on the outer circumferential portion thereof.

The first lever 95 is supported pivotably at a back end portion thereof at a center part of the operation lever 12B and engages with the first and second engagement pins 86, 87 when in the gearshift 16 is in reverse; the second and third engagement pins 87, 88 when in neutral; the third and fourth engagement pins 88, 89 when in first-speed; the fourth engagement pin 89 when in second-speed; the fifth engagement pin 90 when in third-speed; the fifth engagement pin 90 when in fourth-speed; and the first engagement pin 86 when in fifth-speed. The spring 96 biases the first lever 95 to a direction toward the engagement pins 86, 87, 88, 89, 90 of the first rotating body 84 and causes engagement parts 94 of the first lever 95 to engage with the engagement pins 86, 87, 88, 89, 90 variably. The second lever 98 is supported at the rear end thereof at the center part of the operation lever 12B, and has engagement parts 97 which engage with sixth engagement pin 91 when shifting into second and third-speed and engages with seventh engagement pin 92 when shifting in fourth and fifth-speed. The spring 100 biases the second lever 98 toward engagement pins 91, 92 causing the engagement parts 97 to engage with the sixth and seventh engagement pins 91, 92 or to abut against a stopper board 99. The locatable cam 102 is supported rotatably at the support board 17 of the moving cam 71 and has concave portions 101 provided at an outer circumferential part thereof which engage when the gearshift 16 is in its position for reverse, neutral, first-speed, second-speed, third-speed, fourth-speed or fifth-speed. The stopper 104 is provided at the other support board 17 so as to engage with concave portions 101 of the moving cam 102. The gear 108 is fixed to support axle 71b positioned outside of the other support board 17 and has a first non-gear part 105 corresponding to shifting into neutral, a second non-gear part 106 corresponding to shifting into third-speed from second-speed and a third non-gear part 107 corresponding to shifting into fifth-speed from fourth-speed.

The pinion 110 engages with the gear 108 and has a cut portion 109 which enters into the non-gear parts 105, 106 and 107 of the gear 108. The locatable cam 112 is fixed to the inside of the other support board 17 and has concave portions 111 provided at an outer circumferential portion thereof. The stopper 114 is provided at the other support board 17 so as to bias by a spring 113 and engage with the engage concave portions 111.

Figure 57:
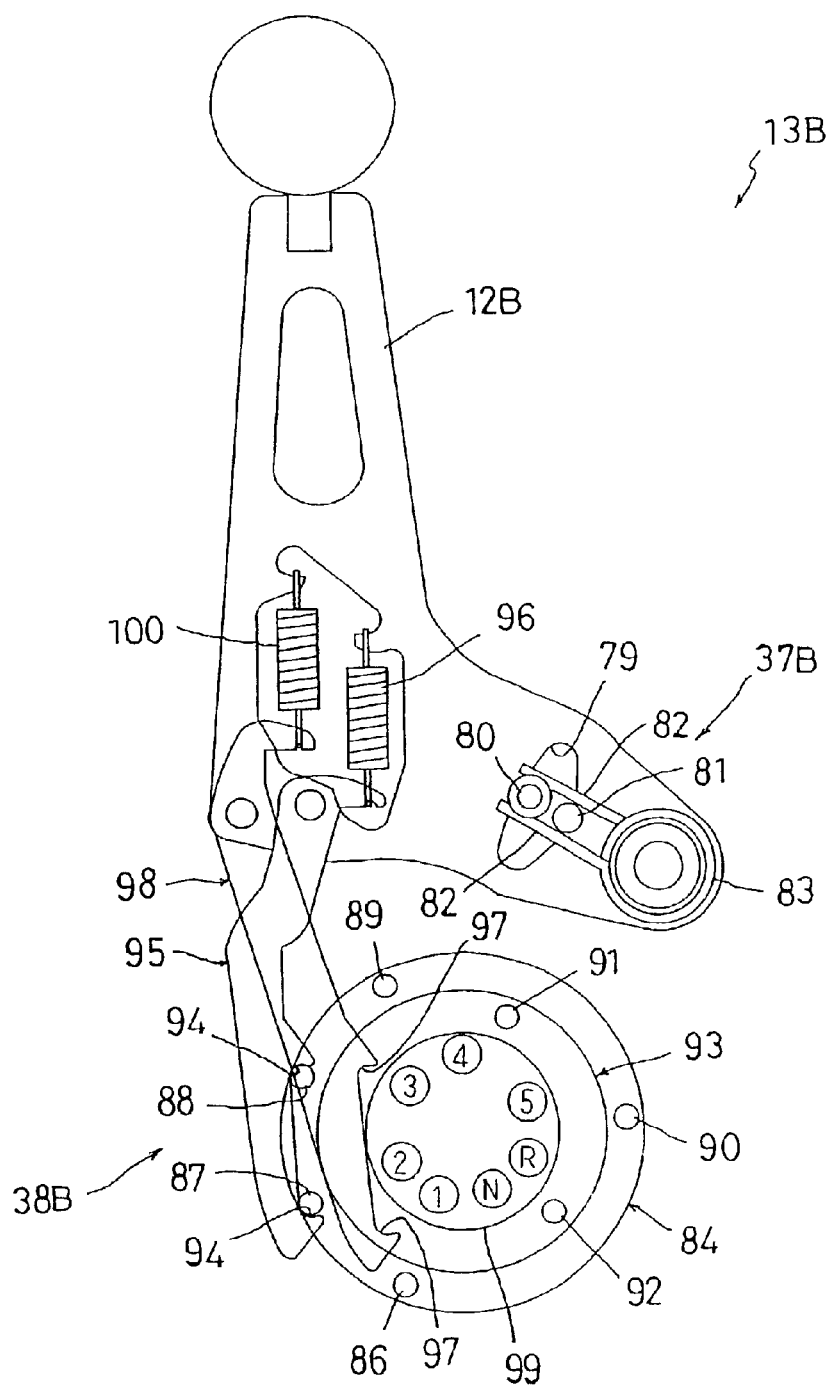
FIG. 57 is an explanation view showing the gearshift-handling mechanism engaged in neutral.

As illustrated in FIG. 57, in the gearshift-handling mechanism 1D of the gearshift 16, when leaving the car in neutral, the engagement parts 94 of the first lever 95 are located in the engaging state with the second and third engagement pins 87 and 88 of the first moving object 84, and the projection 72 of the moving body 76 is located at a neutral position 115 of the cam part 70 of the moving cam 71. In addition, the cut portion 109 of the pinion 110 is located at a central portion of the non-gear portion 105 of the gear so that the moving link 65 is located in an upward orientation.

Figure 58:
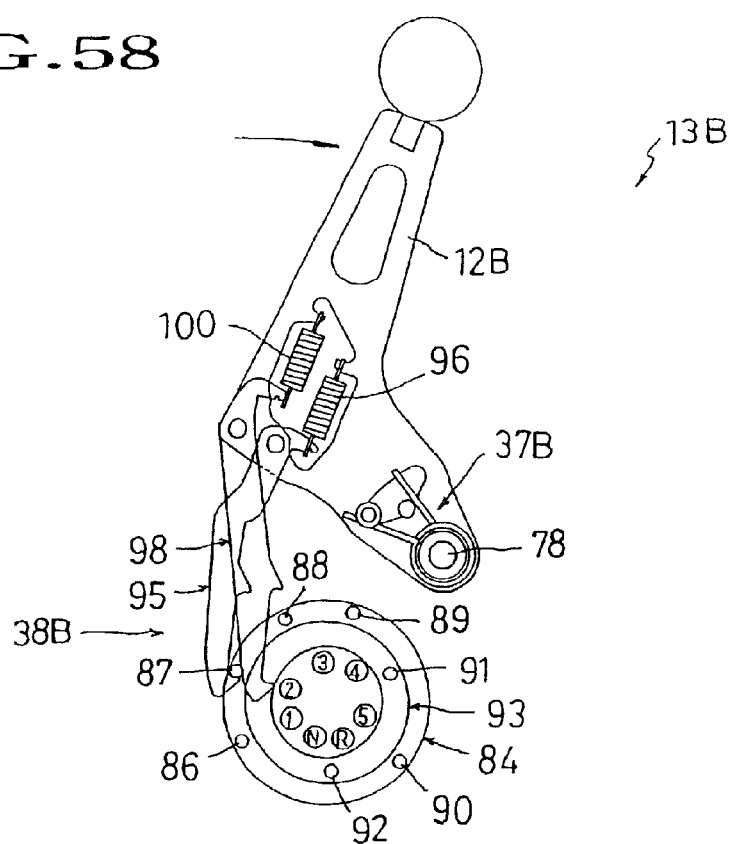
FIG. 58 is an explanation view showing the manner in which a gearshift-handling mechanism is shifted into reverse gear from the neutral position by operating an operation lever.
Figure 59:
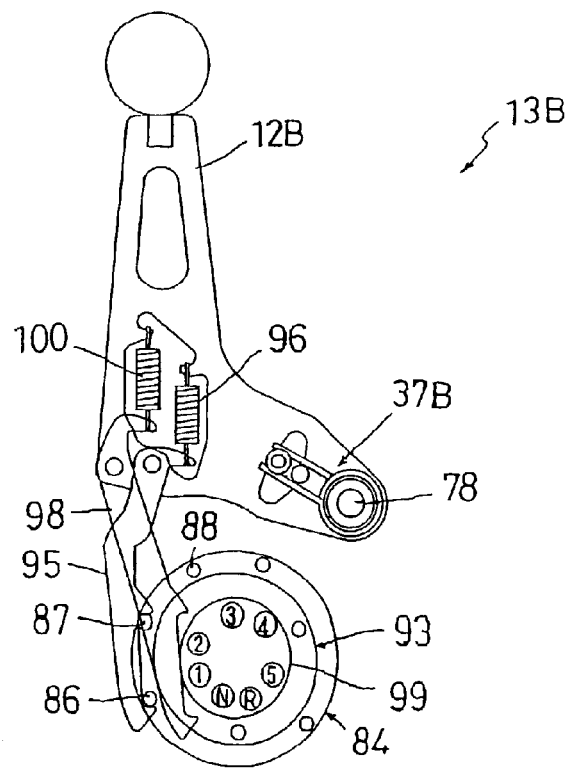
FIG. 59 is an explanation view showing the gearshift-handling mechanism engaged in reverse gear.

As illustrated in FIGS. 58 and 59, when shifting into reverse from the neutral position, due to pressing the operation lever 12B backward and releasing it, the first moving object 84 is given a clockwise rotation when the engagements part 94 of the first lever 95 engages with the second engagement pin 87. After that, the engagement part 94 engages with the first and second engagement pins 86, 87, and the moving cam 71 rotates integrally with the rotation of the first moving object 84. Therefore, the projection 72 is located at a reverse position of the cam part 70, a third cog 117 located at back portion of the non-gear portion 105 of the gear 108 engages with the pinion 110 and the moving link 65 is located in a forward position.

Figure 60:
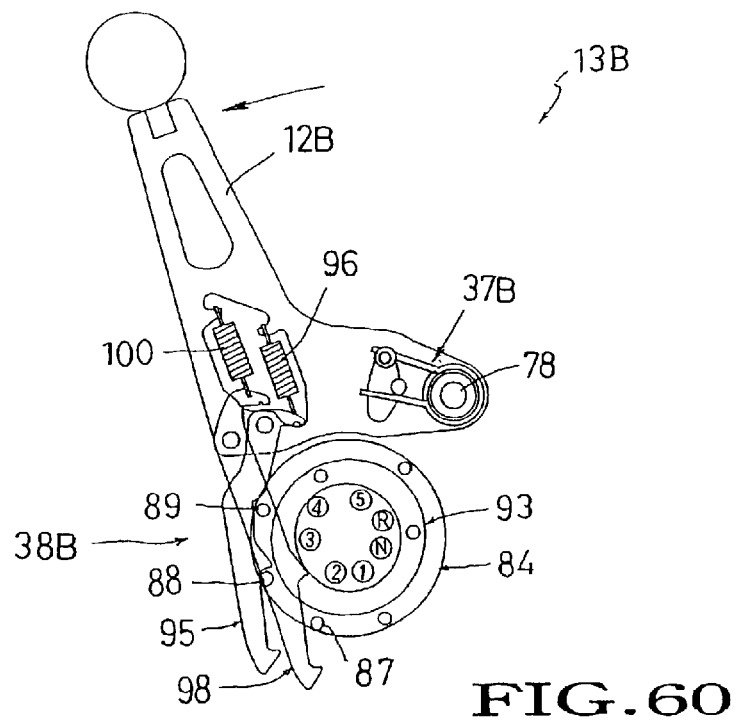
FIG. 60 is an explanation view showing the manner in which a gearshift-handling mechanism is shifted into first-speed from the neutral position by operating the operation lever.
Figure 61:
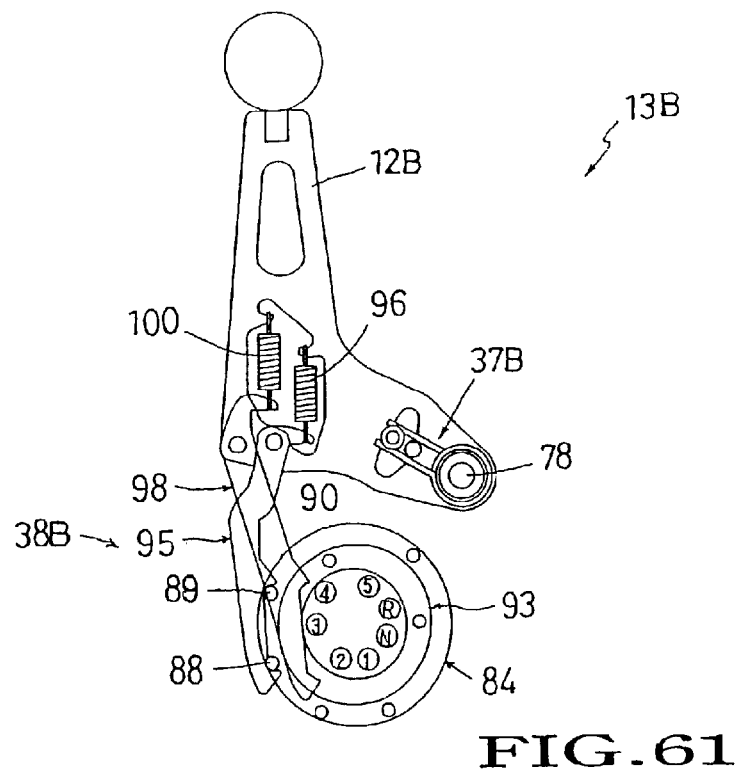
FIG. 61 is an explanation view showing the gearshift-handling mechanism engaged in first-speed.

As illustrated in FIGS. 60 and 61, when shifting into first-speed from neutral, due to pressing the operation lever 12B forward and releasing it, the first moving object 84 is given a counter-clockwise rotation when the engagement part 94 of the first lever 95 engages with the third engagement pin 88. After that, the engagement part 94 engages with the third and fourth engagement pins 88, 89, and the moving cam 71 rotates integrally with the rotation of the first moving object 84. Therefore, the projection 72 is located at a first-speed position 118 of the cam part 70, a first cog 119 located at top portion of the non-gear portion 105 of the gear 108 engages with the pinion 110 and the moving link 65 is located in a backward position.

Figure 62:
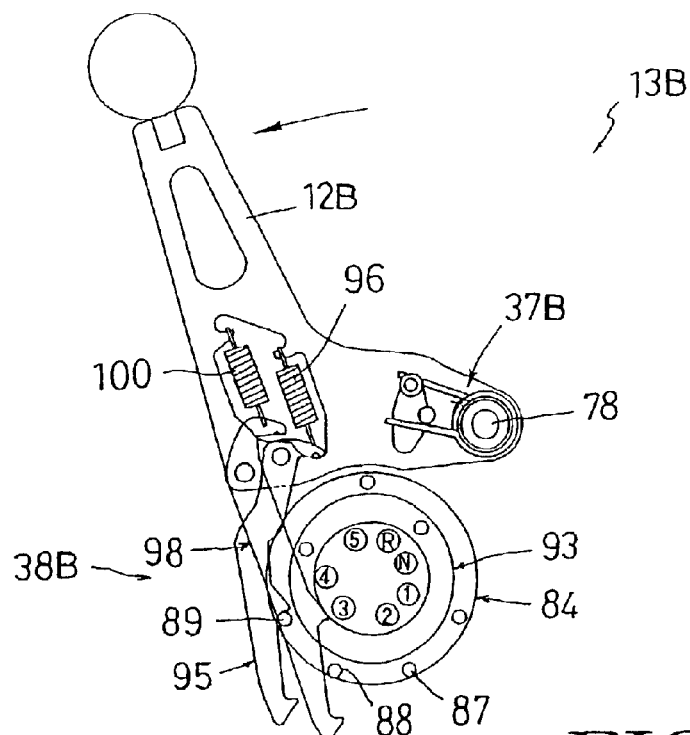
FIG. 62 is an explanation view showing the manner in which a gearshift-handling mechanism is shifted into second-speed from first-speed by operating the operation lever.
Figure 63:
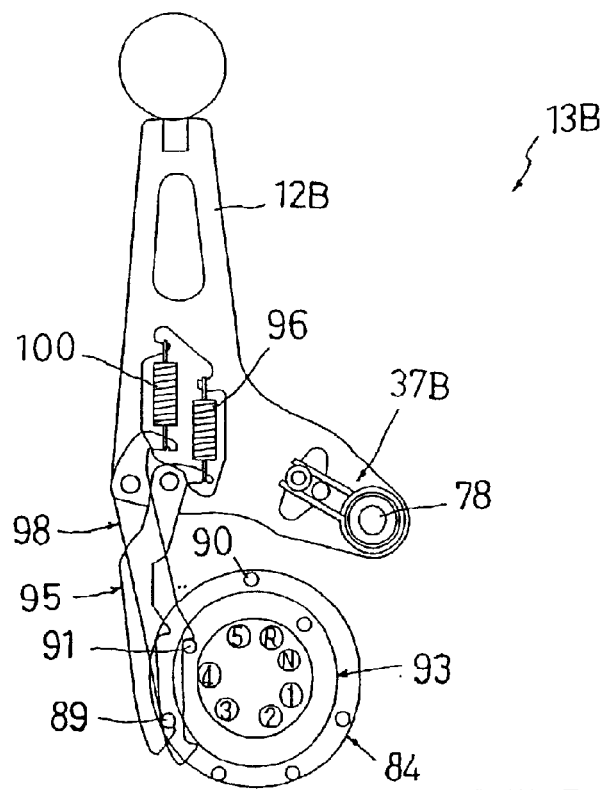
FIG. 63 is an explanation view showing the gearshift-handling mechanism engaged in second-speed.

As illustrated in FIGS. 62 and 63, when shifting into second-speed from first-speed, due to pressing the operation lever 12B forward and releasing it, the first moving object 84 is given a counter-clockwise rotation when the engagement part 94 of the first lever 95 engages with the fourth engagement pin 89. After that, the engagement part 94 engages with the fourth engagement pin 89, and the engagement part 97 of the second lever 98 engages the sixth engagement pin 91 of the second moving object 93, and the moving cam 71 rotates integrally with the rotation of the first moving object 84. Therefore, the projection 72 is located at a second-speed position 120 of the cam part 70, a rear end portion of the first cog 119 engages with the pinion 110 and the moving link 65 is located in a forward position.

Figure 64:
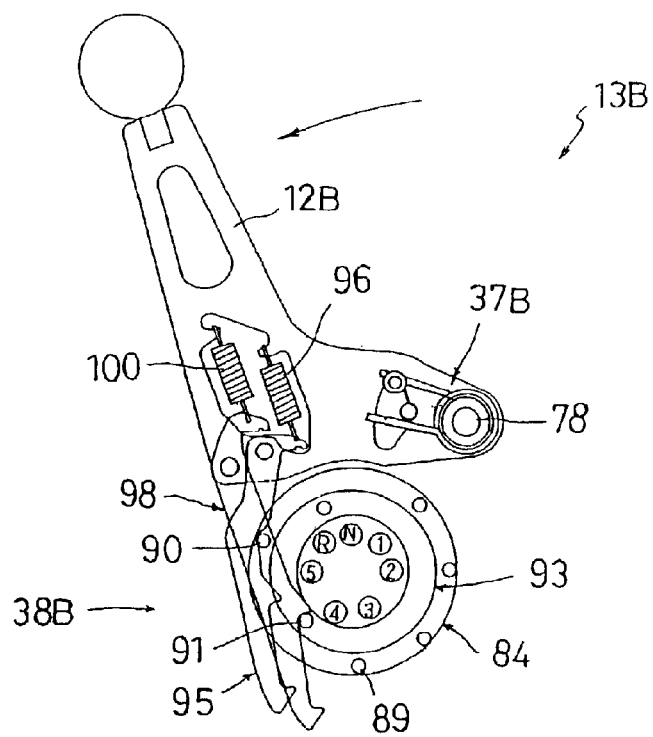
FIG. 64 is an explanation view showing the manner in which a gearshift-handling mechanism is shifted into third-speed from second-speed by operating the operation lever.
Figure 65:
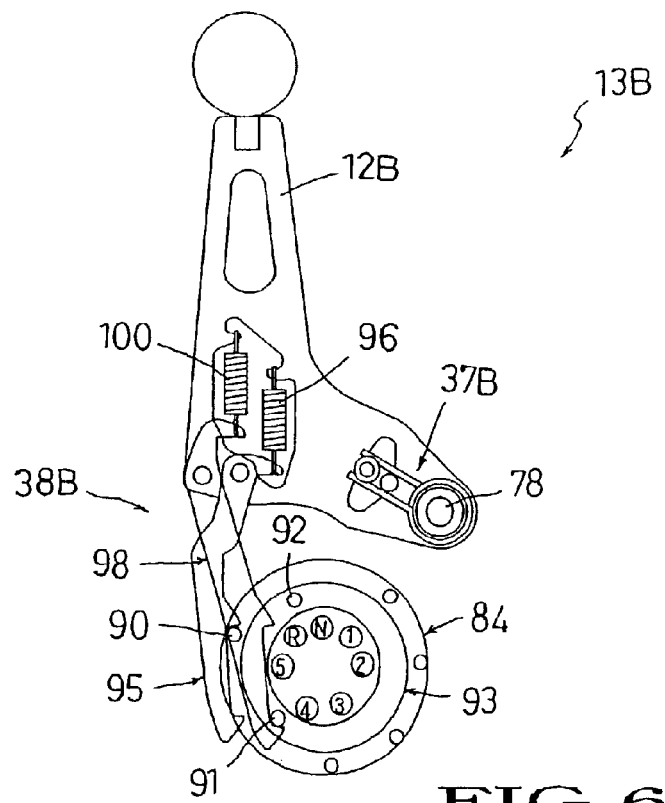
FIG. 65 is an explanation view showing the gearshift-handling mechanism i engaged in third-speed.

As illustrated in FIGS. 64 and 65, when shifting into third-speed from second-speed, due to pressing the operation lever 12B forward and releasing it, the second moving object 93 is given a counter-clockwise rotation when the engagement part 97 of the second lever 98 engages with the sixth engagement pin 91. After that, the engagement part 97 engages with the sixth engagementpin 91 and the engagement part 94 of the first lever 95 engages the fifth engagementpin 90 of the first moving object 84, and the moving cam 71 rotates integrally with the rotation of the second moving object 93. Therefore, the projection 72 is located at a third-speed position 121 of the cam part 70, a top portion of a second cog 122 engages with the pinion 110 passing through the first non-gear portion of the gear 108 and the moving link 65 is located in a backward position.

Figure 66:
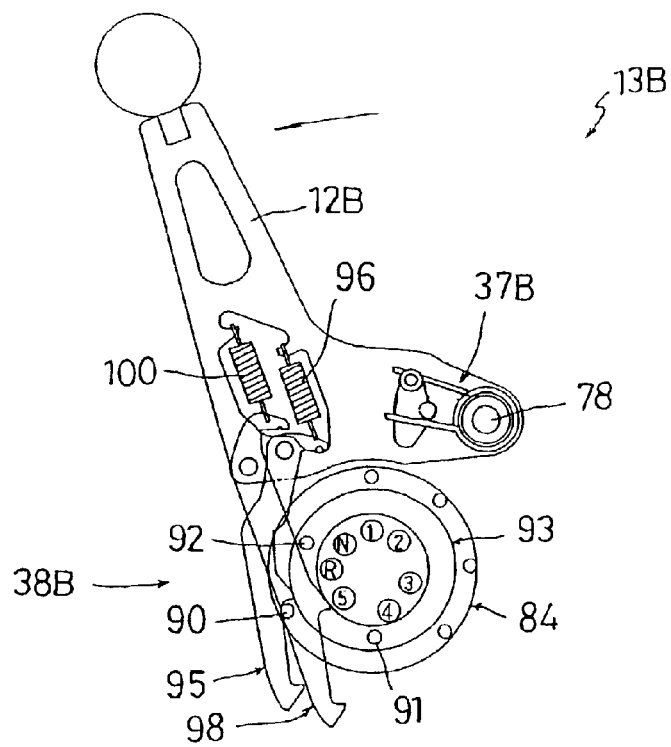
FIG. 66 is an explanation view showing the manner in which a gearshift-handling mechanism is shifted into fourth-speed from third-speed by operating the operation lever.
Figure 67:
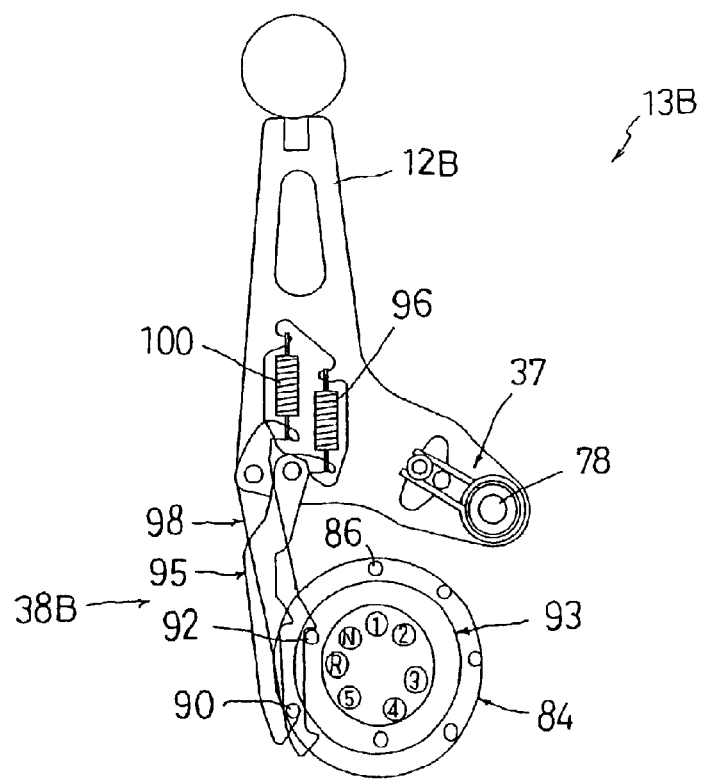
FIG. 67 is an explanation view showing the gearshift-handling mechanism engaged in fourth-speed.

As illustrated in FIGS. 66 and 67, when shifting into fourth-speed from third-speed, due to pressing the operation lever 12B forward and releasing it, the first moving object 84 is given a counter-clockwise rotation when the engagement part 94 of the first lever 95 engages with the fifth engagementpin 90. After that, the engagement part 94 engages with the fifth engagement pin 90, and the engagement part 97 of the second lever 98 engages the seventh engagement pin 92 of the second moving object 93, and the moving cam 71 rotates integrally with the rotation of the first moving object 84. Therefore, the projection 72 is located at a fourth-speed position 123 of the cam part 70, a rear end portion of the second cog 122 engages with the pinion 110 and the moving link 65 is located in a forward position.

Figure 68:
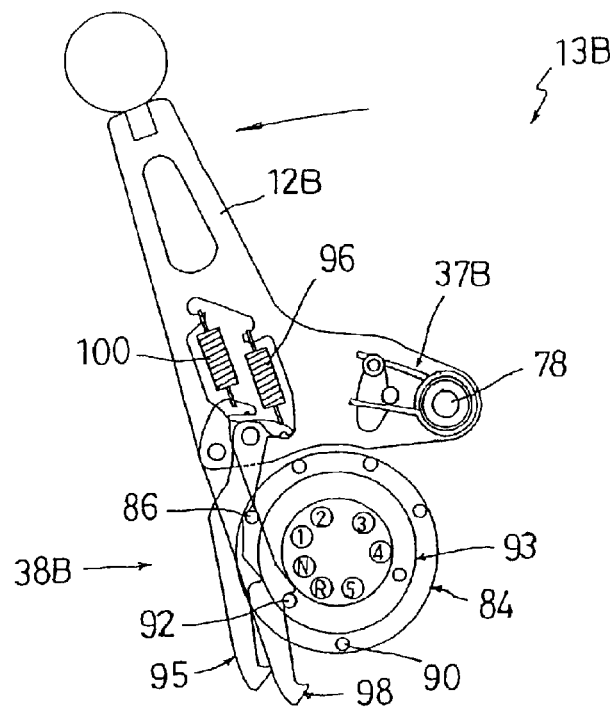
FIG. 68 is an explanation view showing the manner in which a gearshift-handling mechanism is shifted into fifth-speed from fourth-speed by operating the operation lever.
Figure 69:
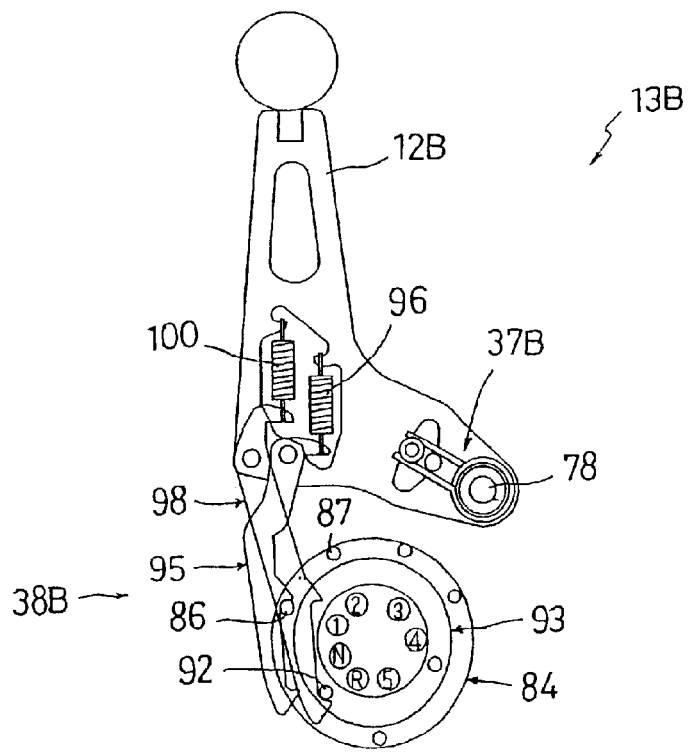
FIG. 69 is an explanation view showing the manner in which a gearshift-handling mechanism is shifted into fifth-speed.
Figure 70:
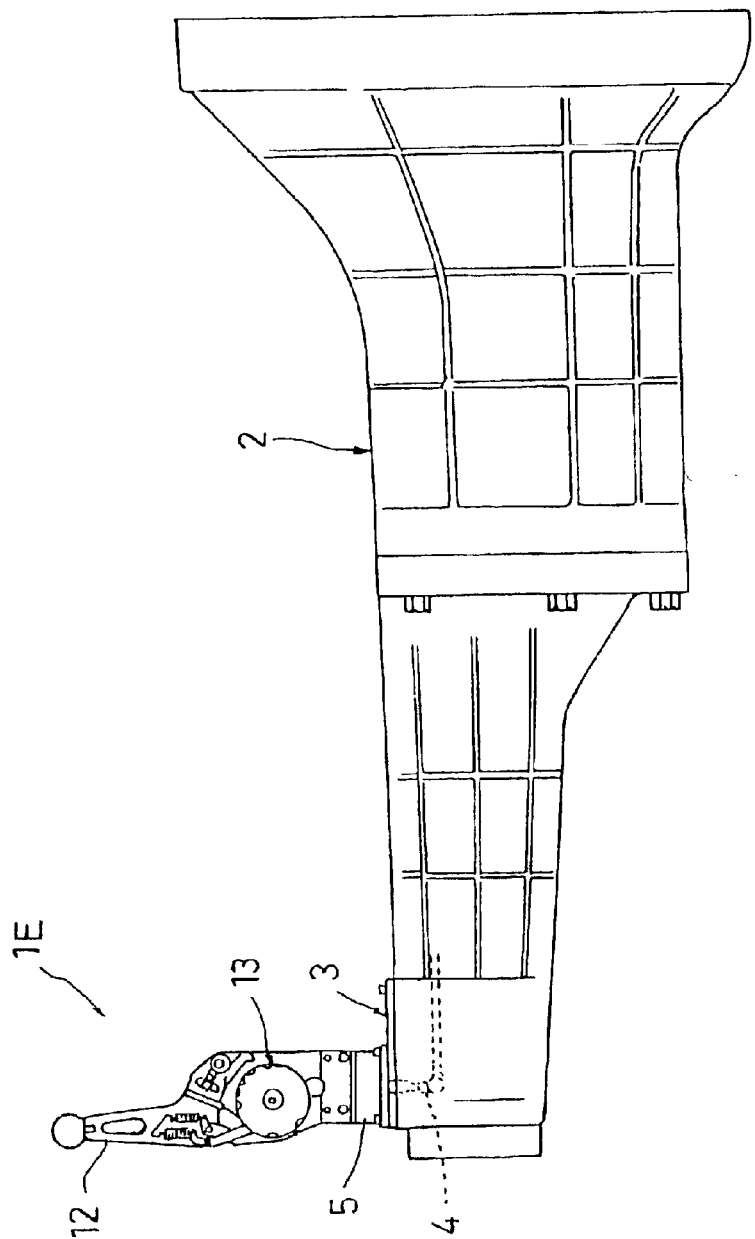
FIG. 70 is a side view showing the manner in which a gearshift-handling mechanism of the gearshift is attached in a sixth embodiment of the present invention.
Figure 71:
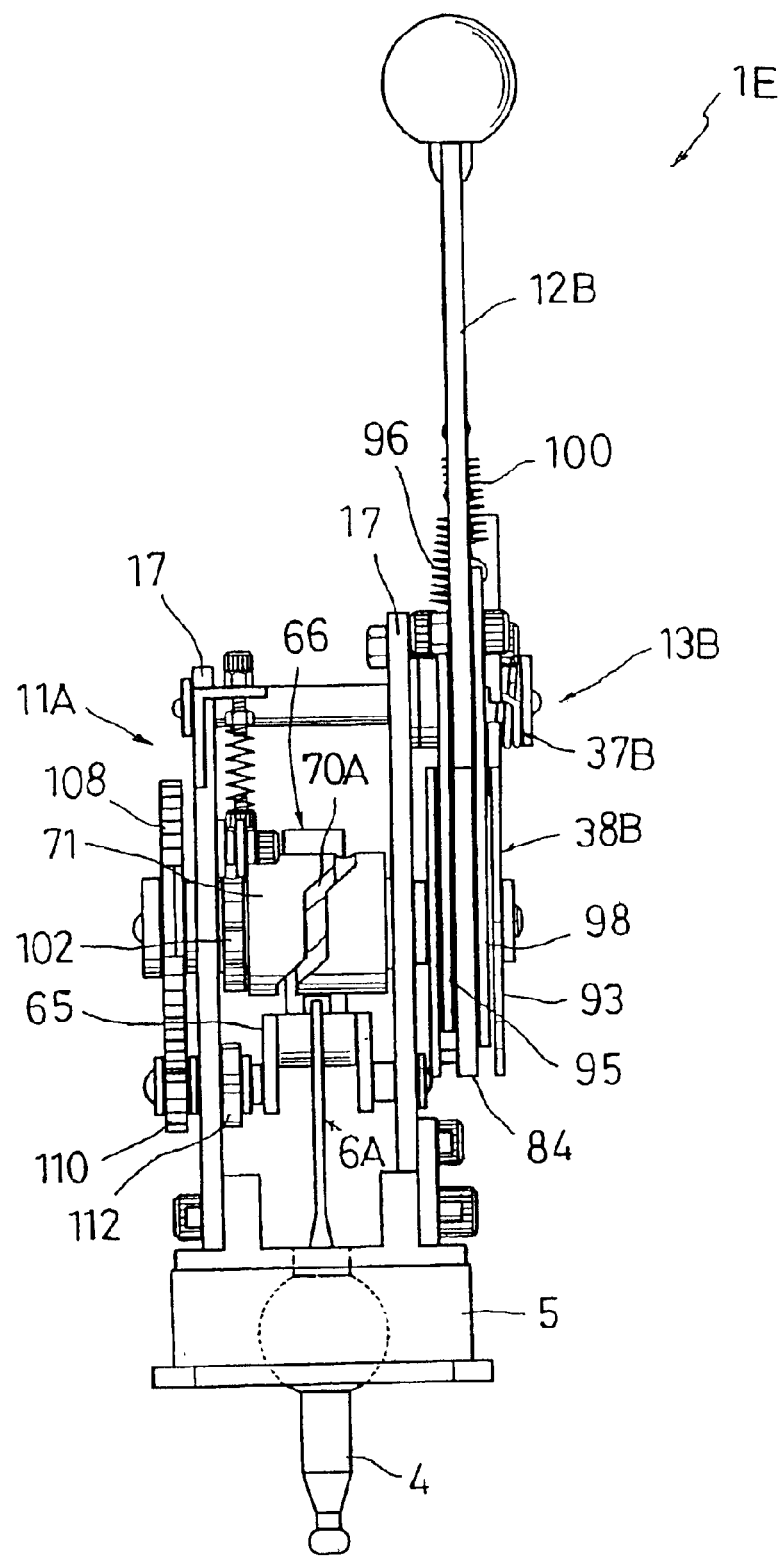
FIG. 71 is a front view showing the sixth embodiment of the present invention.
Figure 72:
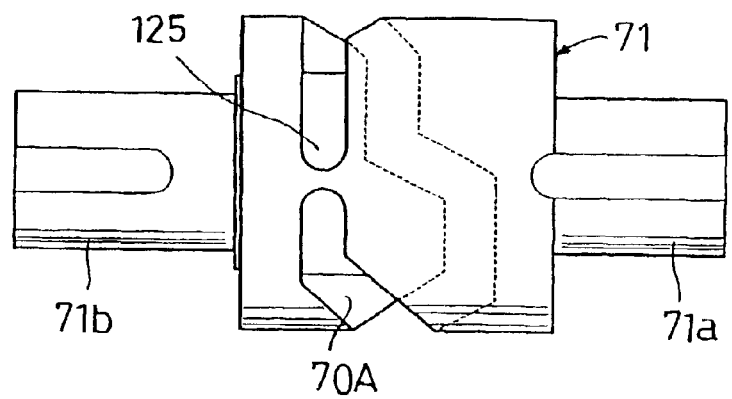
FIG. 72 is an explanation view of a right-left moving cam.
Figure 73:
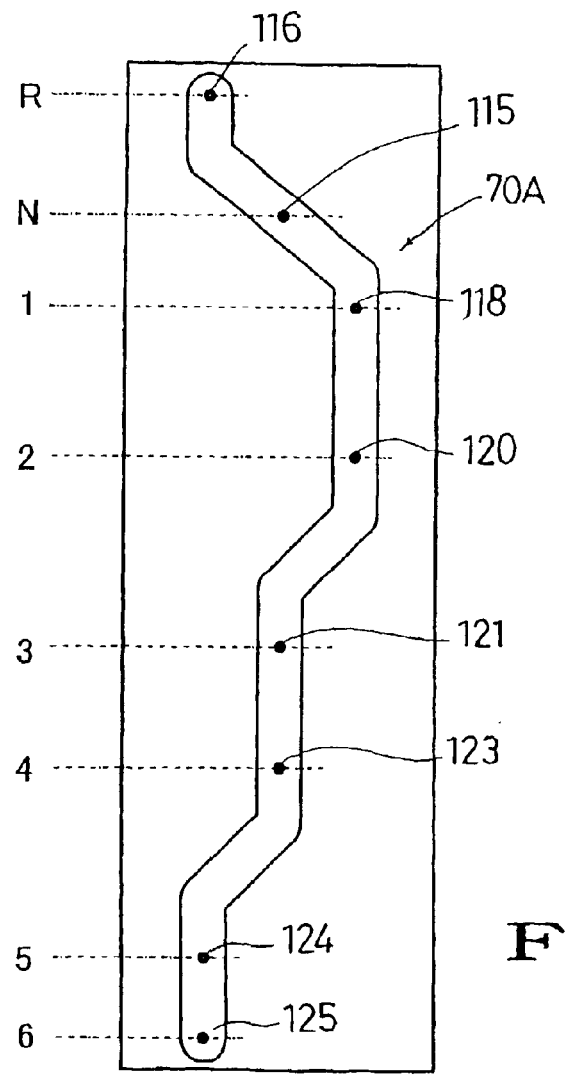
FIG. 73 is an explanation view of a shift pattern of a gear of the sixth embodiment of the present invention.
Figure 74:
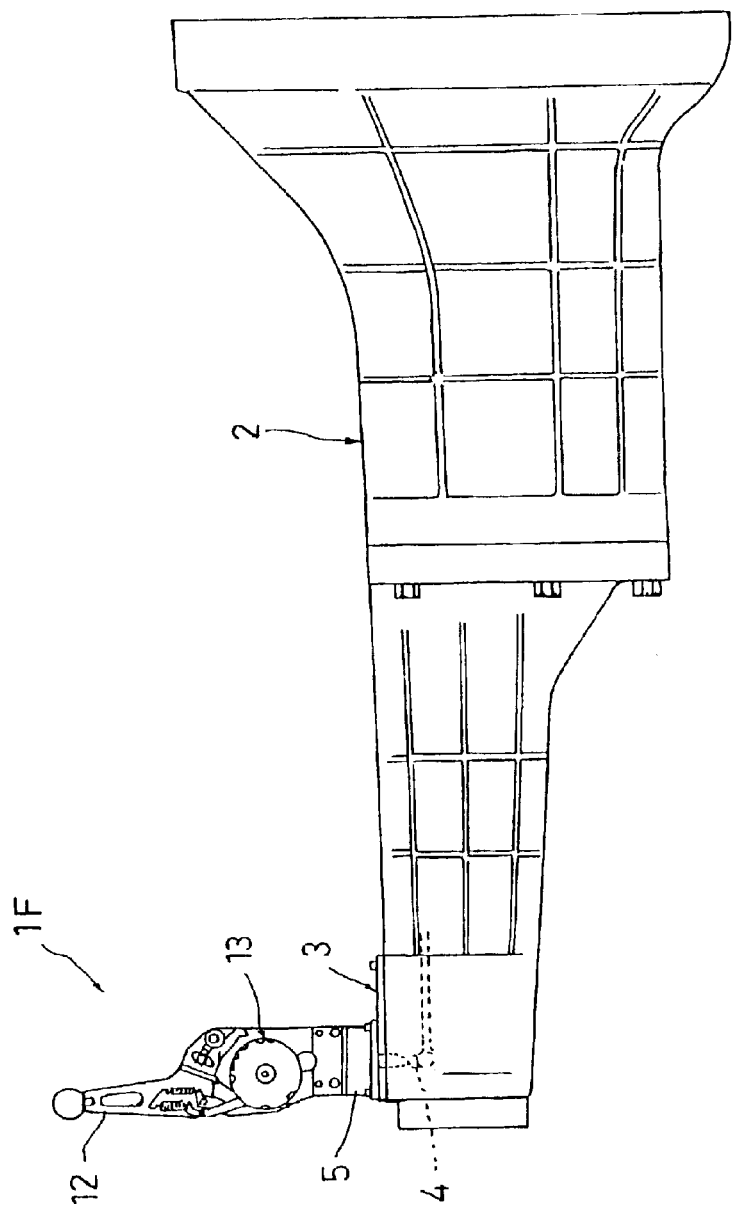
FIG. 74 is a side view showing the manner in which a gearshift-handling mechanism of the gearshift is attached in a seventh embodiment of the present invention.
Figure 75:
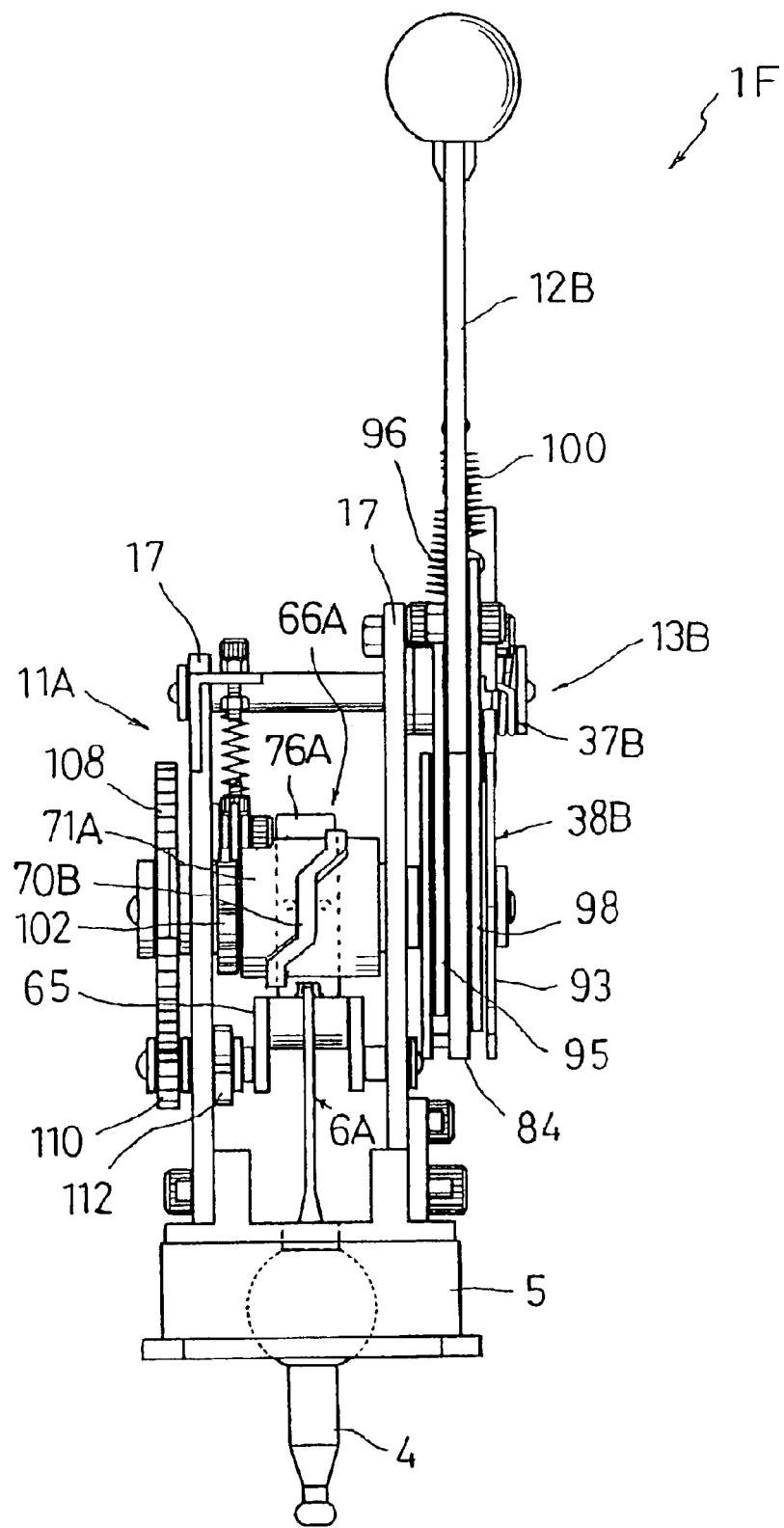
FIG. 75 is a front view showing the seventh embodiment of the present invention.
Figure 76:
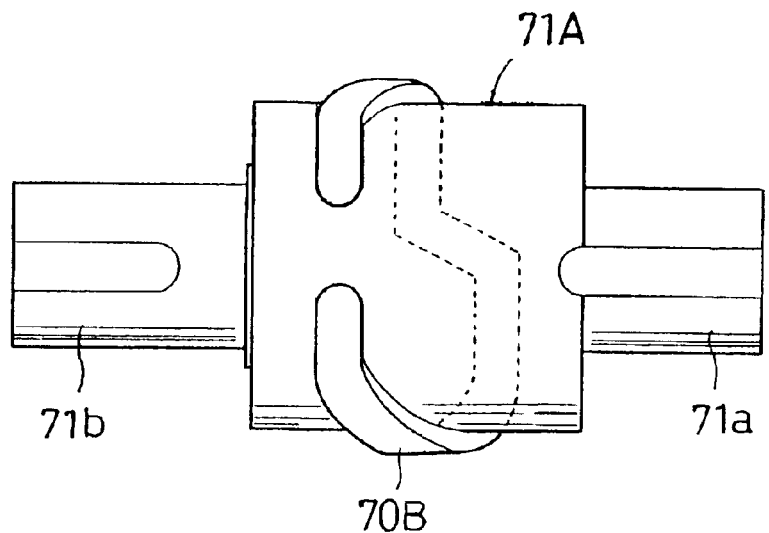
FIG. 76 is an explanation view of a moving cam.
Figure 77:
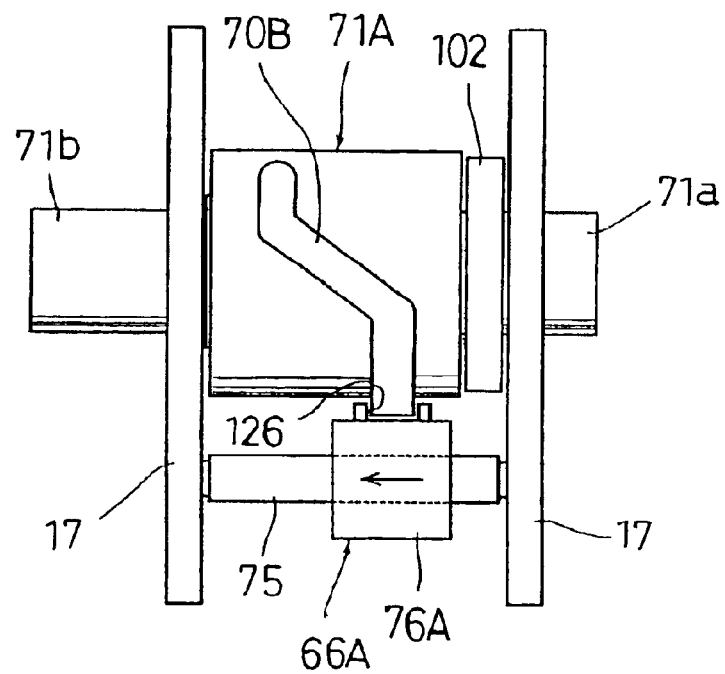
FIG. 77 is an explanation view of a mechanism for moving a moving cam.

As illustrated in FIGS. 68 and 69, when shifting into fifth-speed from fourth-speed, due to pressing the operation lever 12B forward and releasing it, the second moving object 93 is given a counter-clockwise rotation when the engagement part 97 of the second lever 95 engages with the fifth engagement pin 90. After that, the engagement part 97 engages with the seventh engagement pin 92 and the engagement part 94 of the first lever 95 engages the first engagement pin 86 of the first moving object 84, and the moving cam 71 rotates integrally with the rotation of the second moving object 93. Therefore, the projection 72 is located at a fifth-speed position 124 of the cam part 70, a top portion of the third cog 177 passes through the second non-gear portion 107 and engages with the pinion 110 and the moving link 65 is located in a backward position.

Additionally, when the operator shifts each gear in sequential order to shift down, by pressing the operation lever 12B forward and releasing it, the first and second levers 95, 98 and first and second moving objects 84, 93 are operated in opposite order compared with the above-mentioned up-shifting operation.

A sixth embodiment of the present invention is illustrated in FIGS. 70–73. It is distinguished from the fifth embodiment by the fact that a cam part 70A further includes a sixth-speed position 125. A gearshift-handling mechanism 1E according to the sixth embodiment has similar advantages to that of the fifth embodiment.

A seventh embodiment of the present invention is illustrated in FIGS. 74–77. It is distinguished from the fifth embodiment by the fact that the moving cam mechanism 66 is replaced by another moving cam mechanism 66A which includes a moving cam 71A having a cam part 70B formed in the shape of a projection and a moving body 76A having an engagement part 126 which engages with the cam part 70B. A gearshift-handling mechanism 1F with the moving cam mechanism 66A according to the sixth embodiment has similar advantages to that of the fifth embodiment.

As set forth above, the handling mechanism of the gearshift is suitable for being attached in passenger cars, commercial vehicles including buses and trucks, emergency vehicles public service vehicles, racing cars, etc.

What is claimed is:

1. A gearshift-handling mechanism comprising:
  a shift fork;
  a gearshift attached to said shift fork and including a projecting portion having an elongate aperture;
  a movement mechanism for moving said gearshift in a substantially H-shaped configuration to engage gears, said movement mechanism including a pair of support boards, a movable link rotatably coupled to said support boards and extending through said elongate aperture in said gearshift, a movable cam rotatably mounted to said support boards and defining a groove constituting a cam part, and a movable body engaging with said cam part and with said gearshift;

an operation lever pivotally supported on said support boards to move forward and backward in a single plane;

an auto-return mechanism arranged to return said operation lever automatically to an initial position when said operation lever is moved forward or backward and released; and a rotation mechanism coupled to said link and said cam and arranged to enable said operation lever to move sequentially through all of the gears upon movement of said operation lever forward or backward.

2. The mechanism of claim 1, further comprising a housing, said gearshift projecting from said housing.

3. The mechanism of claim 2, wherein said support boards are fixed to said housing.

4. The mechanism of claim 1, wherein a first one of said support boards is arranged on one side of said gearshift and a second one of said support boards is arranged on an opposite side of said gearshift.

5. The mechanism of claim 1, wherein said link is in the shape of a crank.

6. The mechanism of claim 1, wherein said link is attached to a rear end of said support boards and said cam is attached to a front end of said support boards.

7. The mechanism of claim 1, wherein said body engages with said projecting portion of said gearshift.

8. The mechanism of claim 1, wherein said gearshift includes a shift lever body forming an integral unit with said shift fork, said elongate hole being arranged in an upper portion of said shift lever body, and an engagement portion projecting from said upper portion of said shift lever body.

9. The mechanism of claim 1, further comprising a pair of support axles arranged at least partially between said support boards, said body being arranged to slide along said support axles.

10. The mechanism of claim 1, said body includes a concave portion arranged to engage with said projecting portion of said gearshift and an engagement projection arranged to engage with said cam part.

11. The mechanism of claim 1, wherein said rotation mechanism comprises:

at least one rotating body;

a plurality of engagement pins corresponding to the number of gears arranged on an outer portion of said at least one rotating body;

at least one lever pivotally connected to said operation lever and including engagement portions arranged to engage with said engagement pins; and springs connected at a first end to said at least one lever and at a second end opposite to said first end to said operation lever such that a resilient force of said springs causes said at least one lever to engage with said engagement pins.

12. The mechanism of claim 11, wherein said engagement portions are arranged to engage with said engagement pins at a front end of said at least one lever.

13. The mechanism of claim 11, wherein said engagement portions are arranged to engage with said engagement pins at a middle portion of said at least one lever.

14. The mechanism of claim 1, wherein said rotation mechanism is arranged to be interposed between the gears and said gearshift to cause selection of one of the gears by a ratcheting action.

15. The mechanism of claim 1, wherein said operation lever is arranged to be the only lever required to be actuated by the user to enable changing of gears.

16. The mechanism of claim 1, wherein said operation lever is arranged to enable selection of all gears.

17. The mechanism of claim 1, wherein said gearshift is arranged to engage at least one forward gear and a reverse gear.

* * * * *